United States Patent [19]
Rubinstein et al.

[11] Patent Number: 5,913,215
[45] Date of Patent: Jun. 15, 1999

[54] BROWSE BY PROMPTED KEYWORD PHRASES WITH AN IMPROVED METHOD FOR OBTAINING AN INITIAL DOCUMENT SET

[75] Inventors: Seymour I. Rubinstein, 337 Belvedere Ave., Belvedere, Calif. 94920; Garnet R. Chaney, Novato, Calif.

[73] Assignee: Seymour I. Rubinstein, Novato, Calif.

[21] Appl. No.: 08/802,642

[22] Filed: Feb. 19, 1997

Related U.S. Application Data

[63] Continuation-in-part of application No. 08/687,656, Jul. 26, 1996, Pat. No. 5,721,897, which is a continuation-in-part of application No. 08/628,098, Apr. 9, 1996, Pat. No. 5,794,233.

[51] Int. Cl.$^6$ .................................................. G06F 17/30
[52] U.S. Cl. ............................ 707/10; 707/3; 707/513
[58] Field of Search ............................. 707/10, 3, 513

[56] References Cited

U.S. PATENT DOCUMENTS

| | | | |
|---|---|---|---|
| 5,201,048 | 4/1993 | Coulter et al. | 395/600 |
| 5,278,980 | 1/1994 | Pedersen et al. | 395/600 |
| 5,404,514 | 4/1995 | Kageneck et al. | 395/600 |
| 5,418,948 | 5/1995 | Turtle | 395/600 |
| 5,537,586 | 7/1996 | Amram et al. | 395/600 |
| 5,544,360 | 8/1996 | Lewak et al. | 395/600 |
| 5,576,954 | 11/1996 | Driscoll | 395/603 |
| 5,598,557 | 1/1997 | Doner et al. | 395/600 |
| 5,634,121 | 5/1997 | Tracz et al. | 395/602 |
| 5,649,186 | 7/1997 | Ferguson | 395/610 |
| 5,659,732 | 8/1997 | Kirsch | 707/5 |
| 5,680,563 | 10/1997 | Edelman | 395/348 |
| 5,708,825 | 1/1998 | Sotomayor | 395/762 |

OTHER PUBLICATIONS

PCT Search Report, PCT/US97/06261

Haskin, David, "WebSeek and Ye Shall Find (Version 2.0 of ForeFront's WebSeeker Web Search Engine)", PC Magazine, vol. 15, No. 21, Dec. 3, 1996, p. 66.

"WISE: A World Wide Web Resource Database System", Yuwono, et al., IEEE Transactions on Knowledge and Data Engineering, V8, No. 4, pp. 548–554, Aug. 1996.

"Surfin'Network Resources Across The Web", Deri, L. Proceedings Of The IEEE Second International Workshop On Systems Management, pp. 158–167, Jun. 1996.

"Info–Plaza: A Social Information Filtering System For The World–Wide Web", Hiraiwa, et al., International Conference On Parallel And Distributed Systems, pp. 10–15, Jun. 1996.

"Meta Searches–Access Multiple Search Engines", 2 pp., URL: http://www.freeality.com/metay.htm, downloaded Feb. 18, 1998.

"Power Search–If It Exists We Will Find It Fast", 1 page http://www.frazer-nash.com/power/power.html, downloaded Feb. 18, 1998.

PCT Search Report, PCT/US97/20030, 3 pages, May 5, 1998.

(List continued on next page.)

*Primary Examiner*—Paul R. Lintz
*Attorney, Agent, or Firm*—Blakely, Sokoloff, Taylor & Zafman LLP

[57] ABSTRACT

An apparatus and method for identifying one of a plurality of documents stored in a computer-readable medium are disclosed. The method includes the steps of prompting a computer-user to construct a search expression, then communicating the search expression to each of a plurality of search engines located at respective World Wide Web sites. Each of the plurality of search engines is prompted to concurrently identify a respective plurality of web pages containing text consistent with the search expression and to return a respective URL for each such web page identified. Redundant URLs returned by the search engines are filtered to obtain an initial set of web pages. Each of the initial set of web pages is downloaded and linguistically analyzed to automatically identify for the computer-user keyword phrases therein. The computer-user is prompted to construct a query expression in which one or more keyword phrases from the initial set of web pages is an operand. The query expression is then used to identify at least one web page of the initial set of web pages and the identified web page is presented to the user in the form of an abstract.

16 Claims, 22 Drawing Sheets

OTHER PUBLICATIONS

"Iconovex Ships Tool For Web Pages", Interactive Age Magazine, Apr. 24, 1995, 1 pg.

"Anchorpage For Windows 95/NT Is Now Shipping", Iconovex Press Release, Oct. 20, 1995, 1 pg.

"Indexicon Logo SPEC SHEET", Prior to Apr. 1, 1996, 2 pgs.

"Anchor's A way For Web Docs", Dec. 1, 1995, James E. Powell, 2 pp.

"Automatic Indexing and Abstracts", Windows Magazine, May 1, 1995, 1 pg.

"AnchorPage: an Overview", Anchor Page User's Guide, Oct. 25, 1995, 6 pp.

"indexicon Indexes Documents Quickly", PC Magazine, Sep. 13, 1995, David Haskines, 1 pg.

BROWSE BY PROMPTED KEYWORD PHRASES WITH AN IMPROVED METHOD FOR OBTAINING AN INITIAL DOCUMENT SET

CROSS-REFERENCE TO RELATED APPLICATIONS

This is a continuation-in-part of application Ser. No. 08/687,656, now U.S. Pat. No. 5,721,897, filed Jul. 26, 1996, which is a continuation-in-part of application Ser. No. 08/628,098, now U.S. Pat. No. 5,794,233, filed Apr. 9, 1996.

BACKGROUND OF THE INVENTION

1. Field of the Invention

The present invention relates to the field of computerized document management. More specifically, the present invention relates to a method and apparatus for obtaining an initial set of documents and then identifying one of the initial set of documents by permitting a computer user to browse the documents by prompted keyword phrases using an improved user interface.

2. Art Background

In modern computer application programs, such as commercially available word processor programs, a user choosing to open a data file is typically provided with a list of data files contained in the active directory or folder and prompted to select one. The process of selecting a data file varies based on the user's foreknowledge of the data file sought, and generally falls into one of four cases. First, if the user knows the name of the file sought and the filename is listed, the user simply selects that file. Second, if the user does not know the filename but knows the general nature of the subject matter sought, the user may still be able to select the file of interest on the basis of its filename. In this case, the user may have to open and examine the content of several files having filenames related to the subject of interest before opening a satisfactory file. If, in a third case, the user doesn't know the name of the file sought or even the general nature of the subject matter sought, but seeks a file referencing or discussing a specific word or phrase, the user may need to open each of the files in turn and perform either a manual or automated search for the "keyword phrase" of interest. File by file search for keyword phrases can be time consuming and tedious, particularly if there are a large number of files. In most instances, consequently, the search for keyword phrases within files can be automated either by application program or by operating system utility (the former being exemplified by search features commonly provided by word processors, the latter by the UNIX grep utility). In the fourth and final case, if the user doesn't know the filename, subject matter or even keyword phrases sought, but simply wishes to browse the documents until something of interest appears, the user must do this on a file by file basis.

The Internet presents a similar content discovery problem, but on a much larger scale. On the World Wide Web (the "web"), the graphical portion of the Internet, an enormous number of documents referred to as "web pages" are linked together through Hypertext Markup Language (HTML) constructs to form a single searchable data object. A search engine, itself located at an Internet site, can be used to identify web pages containing a user-specified expression in a manner analogous to the way a UNIX grep utility can be used to locate search expressions within local files. Searching for data on the web using a search engine presents at least two problems, however. First, due to the volume of traffic on the web, searching can be slow. Second, once an initial set of web pages has been identified by the search engine, the user is still faced with the content discovery problem described above. Namely, unless the user already knows the exact web page sought, the user may have to supply additional search terms to reduce the number of web pages in the initial set or, in the worst case, browse the initial set of web pages one after the other until something of interest appears.

It would be desirable to allow the user to browse local files or web pages by extracting the essential concepts of the local files or web pages and presenting them to the user in the form of an abstract. Furthermore, it would be desirable to relieve the user of the burden of conceiving search terms by automatically identifying keyword phrases in the initial set of local files or web pages and presenting them to the user at the time the user seeks to identify a document. The user could then select one or more of the keyword phrases, join them in a logical expression and allow the computer to identify one or more local files or web pages most nearly satisfying the logical expression of keyword phrases. Also, it would be desirable to more rapidly and comprehensively search the World Wide Web to locate an initial set of web pages containing a user-specified search expression. These and other benefits are achieved by the method and apparatus of the present invention.

BRIEF SUMMARY OF THE INVENTION

A method and apparatus for identifying one of a plurality of documents stored in a computer-readable medium are disclosed. The method allows a computer user to browse the plurality of documents by prompting the user to construct a query expression from an automatically generated list of keyword phrases. Once selected by the user, the query expression is used to identify one of the plurality of documents and an abstract of the identified document is presented to the user. Identification of the keyword phrases and generation of the abstract is performed by linguistically analyzing the documents. The method of the present invention includes the steps of automatically identifying for a user keyword phrases in the plurality of documents, prompting the user to construct a query expression in which at least one of the keyword phrases is an operand, and identifying one of the plurality of documents based on the query expression.

In addition, an improved user interface provides the capability to display either or both key words and key phrases on the display screen in separately scrollable display areas. These separately scrollable display areas are dynamically sized to render visible the selected text. A set of dynamically created tabs in a tabbed index provide a means to index into the content of each display area. The font of the selected and displayed text is dynamically set to maximize the display area. The plurality of documents from which key words or key phrases are taken may be documents from a computer network, including web pages from the World Wide Web, or documents from a local hard-drive. A concept editor allows key words or key phrases to be grouped under a concept identifier and used in document search queries.

A method and apparatus is disclosed for identifying one of a plurality of documents stored in a computer-readable medium, the method comprising the computer-implemented steps of: 1) automatically identifying for a user keyword phrases in the plurality of documents; 2) displaying a tabbed index indicative of content of the keyword phrases; 3) prompting the user to construct a query expression in which at least one of the keyword phrases is an operand; and 4) identifying one of the plurality of documents based on the query expression.

An improved method for searching the World Wide Web to identify an initial set of documents is also disclosed. The computer-user is prompted to enter a search expression that can be used to identify the initial set of documents and the search expression is communicated to a plurality of Internet search engines. The search engines are prompted to concurrently inspect a respective plurality of web pages and return the URLs of web pages containing text consistent with the search expression. Redundantly returned URLs are filtered so that a non-redundant initial set of web pages is identified from which an automatically generated list of keyword phrases can be extracted. The list of keyword phrases can then be used to prompt the user to construct a query expression as described above.

BRIEF DESCRIPTION OF THE DRAWING

The features and advantages of the present invention will be more fully understood by reference to the accompanying drawing, in which:

FIG. 11 depicts a Phrases View window used to display keyword phrases obtained by linguistically analyzing each of an initial set of web pages.

FIG. 12 depicts a Words View window used to display keywords obtained by linguistically analyzing each of an initial set of web pages.

DETAILED DESCRIPTION OF THE INVENTION

In the following detailed description of the present invention numerous specific details are set forth in order to provide a thorough understanding of the present invention. However, it will be obvious to one skilled in the art that the present invention may be practiced without these specific details.

Overview of a Method For Identifying One of a Plurality of Documents

Figure 1:
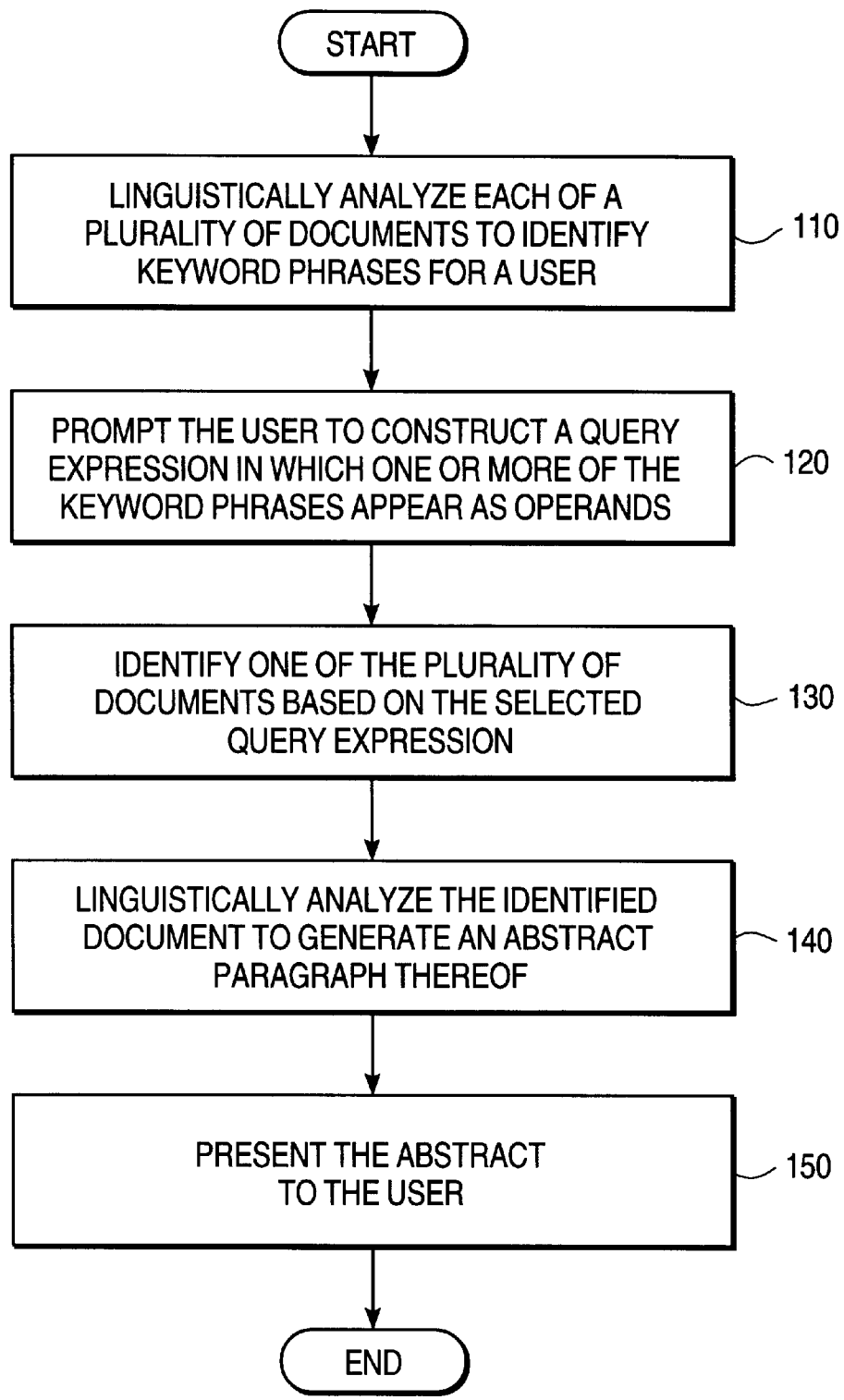
FIG. 1 illustrates a method according to the present invention.

FIG. 1 illustrates a method for identifying one of a plurality of documents stored in a computer-readable medium by prompting a computer user (typically a human operator) to construct a query expression from an automatically generated list of keyword phrases. Herein the term document refers to a computer-readable arrangement of data and includes ASCII and other character based files as well as binary files having a format interpretable by an application program. In the present invention, these documents may be locally resident files or pages on the World Wide Web (WWW). The web pages are stored at web sites on the WWW and accessible using a Universal Resource Locator (URL).

At step 110, each of the plurality of documents is linguistically analyzed to identify keyword phrases therein, and the identified keyword phrases are presented to the user. A keyword phrase is a combination of two or more words expressing a significant concept, and a document is said to contain a keyword phrase if the keyword phrase literally appears in the document or its basis for derivation appears in the document. For example, a document containing the phrase "clothing that is machine washable" contains the keyword phrase "machine washable clothing" because, even though "machine washable clothing" does not appear literally in the document, the basis for deriving the keyword phrase does. Linguistic analysis and identification of keyword phrases is discussed further below. At step 120, the user is prompted to construct a query expression by selecting keyword phrases from the presented set of keyword phrases. A query expression is a logical expression in which one or more keyword phrases appear as operands. At step 130, one or more of the plurality of documents is identified based on the constructed query expression. For example, if the plurality of documents consists of the set (A, B, C, D, E) and the query expression is: keyword phrase 1 AND keyword phrase 2 AND NOT keyword phrase 3, then the document from the set (A, B, C, D, E) satisfying or most nearly satisfying the query expression (i.e., containing keyword phrase 1 and keyword phrase 2, but not containing keyword phrase 3), will be identified by step 130. At step 140, an abstract of the document is generated, and at step 150 the document abstract is presented to the user. As will be discussed further below, the document abstract is obtained by linguistic analysis of the identified document to identify key concepts therein.

First Embodiment of the User-interface

Figure 2:
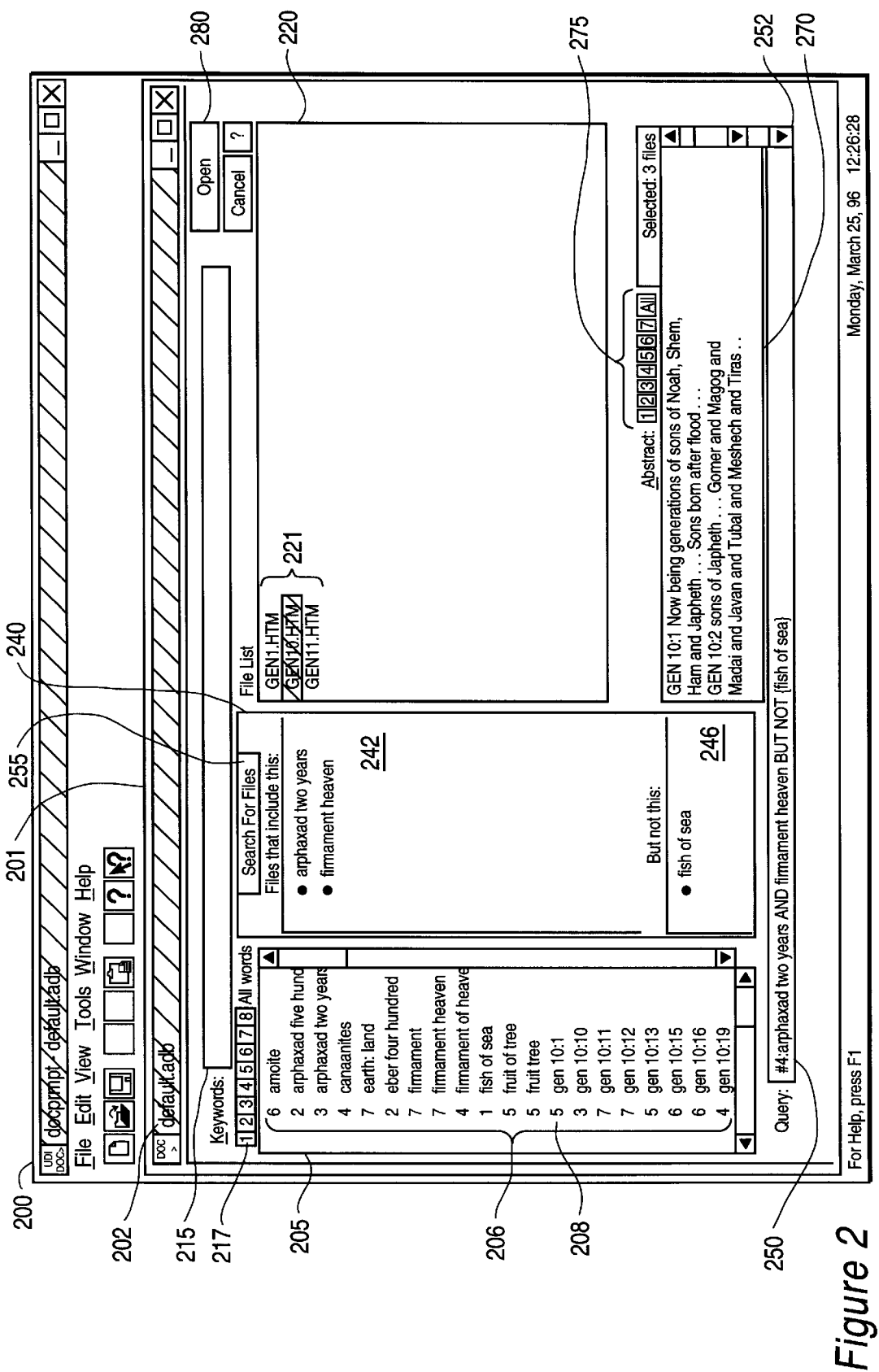
FIG. 2 depicts one embodiment of a user-interface according to the present invention.

FIG. 2 depicts a user-interface 200 allowing a computer user to identify one of a plurality of documents in accordance with the method described above. The user-interface 200 is presented to the user in response to a document select request such as a request to open a data file in a word processing or other text-intensive application. The user may not know a priori the specific document or even the subject matter he or she seeks. In the present invention, therefore, the user-interface 200 includes a dialog box 201 that presents an automatically generated list of search terms, referred to as keyword phrases, in a keyword pane 205. The listed keyword phrases 206 act to "prompt" the user to search for information of interest without requiring the user to conceive search terms. Thus, the present invention relieves the user from the burden of creating a document search expression, and instead permits the user to browse the relevant documents on the basis of the automatically generated keyword phrases 206. Keyword entry pane 215 is provided to allow the user to enter keyword phrases that do not appear in the keyword pane 205. The keyword phrases 206 listed in the keyword pane 205 prompt the user to construct a query expression which will be used to identify one of the plurality of documents. Beside each keyword phrase presented in keyword pane 205 is the relevance code 208 of the keyword phrase. Relevance codes 208 are values indicating the importance of the keyword phrase relative to other keyword phrases in the document. As stated above, the keyword phrases are obtained by linguistically analyzing each of a plurality of documents, and, in the preferred embodiment, relevance codes are generated by the linguistic analysis. Linguistic analysis and the relevance codes resulting therefrom are discussed in greater detail below.

Dialog box 201 includes a file list pane 220 listing the documents 221 to be searched. The documents to be searched are drawn from an archive catalog; an arbitrary collection of documents that constitute a single searchable entity. The archive catalog open at any given time is the archive catalog from which the keyword phrases 206 in keyword pane 205 are drawn and the name of the open archive catalog appears in the title bar 202 of dialog box 201. In one embodiment, the computer user may construct and save archive catalogs by selecting documents from a list of documents presented by the computer operating system or its extensions (e.g., the Apple Macintosh Finder or the Microsoft Windows '95 Explorer). Alternatively, archive catalogs can be created automatically from the group of documents residing in an identified area of a computer system's file storage such as a folder or directory. When constructed, an archive catalog becomes the open archive catalog and each of the documents therein appear in file list pane 220. The user may also recall previously constructed archive catalogs. For archive catalogs containing more documents than can be presented in the file list pane 220 at once, the file list pane 220 operates as a virtual window to the complete list of documents and scrollbars allow the user to select the viewpoint of the virtual window at points of interest along the complete list of documents.

Dialog box 201 also includes a search pane 240 which itself contains constituent logic panes 242 and 246. Logic panes 242 and 246 are logical operation elements; graphic constructs that represent logical operators. Search pane 240 prompts the user to construct a query expression by associating keyword phrases 206 with logical operation elements. In one embodiment, this is accomplished by dragging one or more keyword phrases 206 from keyword pane 205 and dropping each into one of the logic panes 242 or 246 (the physical act of moving a displayed object from one location to another is a well known operation performed with a cursor control device such as a mouse or trackball and is referred to as a "drag and drop" operation). As stated above, a query expression is a logical expression in which one or more keyword phrases appear as operands. The act of dropping a selected keyword phrase into one of the two logic panes (242 or 246) within search pane 240 causes the keyword phrase to be logically joined to the query expression. The nature of the logical join is determined by the logic pane (242 or 246) into which the keyword phrase is dropped. Logic pane 242 is referred to as the "INCLUDE" logic pane and keyword phrases dropped therein are initially joined to the query expression by a logical AND operator. When joined to the query expression by a logical AND operator, a keyword phrase must be contained by the document sought in addition to the previously formulated query expression. The phrase "previously formulated query expression" is used herein to refer to the query expression as it exists prior to a drag and drop event and, if no prior drag and drop events have occurred, the previously formulated query expression may consist of an empty set of keyword phrases. In one embodiment, the logical AND operator joining a keyword phrase dropped in the INCLUDE logic pane 242 to the query expression may be converted to a logical OR operator by placing the mouse cursor over the keyword phrase and depressing the right mouse button. A menu will be presented with a selection allowing the logical operator to be toggled between AND and OR. As will be discussed further below in reference to FIG. 3, each keyword phrase joined to the query expression by a logical OR operator is associated with the nearest preceding keyword expression joined to the query expression by a logical AND operator. Search pane 240 also includes "NOT" logic pane 246 for specifying query expressions that are not to appear in the document sought.

In one embodiment of the present invention, the query expression is displayed in query pane 250 as each of its constituent keyword phrases is selected. Query pane 250 enables the user to type a query expression or to edit a query expression previously constructed via the drag and drop technique described above. In this way, complex query expressions may be specified which might be difficult or awkward to construct using the drag and drop technique alone. Further, query pane 250 includes a down arrow 252, which, when selected by the user presents a history of prior query expressions that may be recalled.

Figure 3:
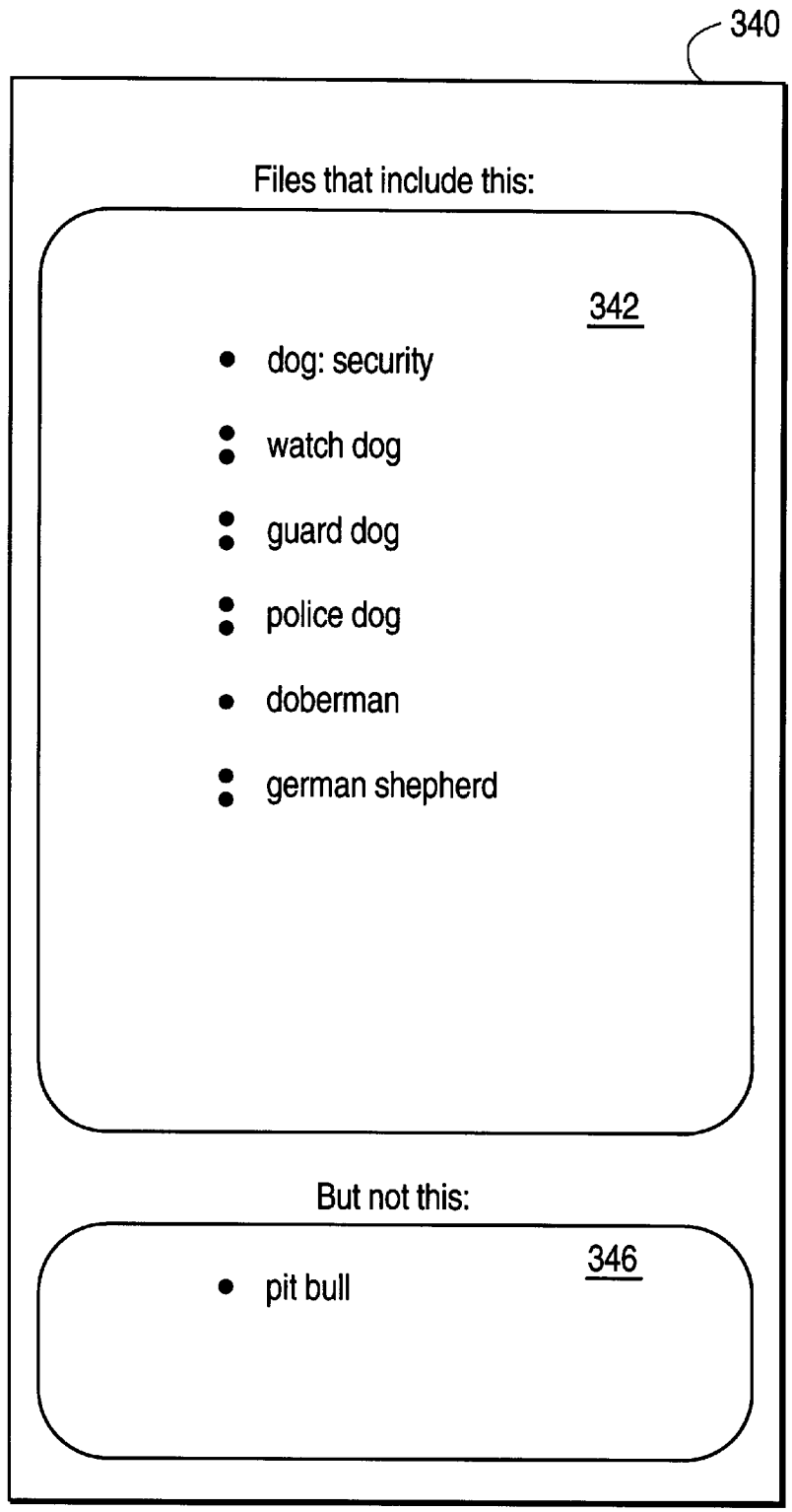
FIG. 3 depicts a search pane used to construct a query expression.

FIG. 3 depicts a search pane containing an exemplary query expression constructed using the interface of one embodiment of the present invention. The query expression "(dog:security OR watchdog OR guard dog OR police dog) and (doberman or german shepherd) AND NOT (pit bull)" may be constructed from a keyword phrase list containing the query expression's constituent keyword phrases as follows: First, the constituent keyword phrases are selected from the list of keyword phrases (not shown) and dropped into INCLUDE logic pane 342 beginning with keyword phrase "dog:security" and ending with keyword phrase "german shepherd". A this point the query pane (not shown) will contain the query expression "dog:security AND watchdog AND guard dog AND police dog AND doberman AND german shepherd". By converting the logical AND operators corresponding to the keyword phrases "watchdog", "guard dog", "police dog" and "german shepherd" to logical OR operators (using the technique described above in reference to FIG. 2), the query expression "(dog:security OR watchdog OR guard dog OR police dog) AND (doberman OR german shepherd)" is obtained. Since a logical OR operator associates a keyword phrase to the nearest preceding keyword phrase joined to the query expression by a logical AND operator, keyword phrases "watchdog", "guard dog" and "police dog" are logically OR'd with the keyword phrase "dog:security" and keyword phrase "german shepherd" is logically OR'd with the keyword phrase "doberman". In accordance with accepted set-theory notation, a single dot adjacent a keyword phrase appearing in INCLUDE logic pane 342 indicates that the keyword phrase is joined to the query expression by a logical AND operator, while two dots adjacent a keyword phrase indicate that the keyword phrase is joined to the query expression by a logical OR operator. Thus, of the keyword phrases dropped in logic pane 342, "dog:security" and "doberman" have a single dot adjacent them while the others have two dots adjacent them. After dropping the keyword phrase "pit bull" in the NOT logic pane 346, the desired query expression is completed. To change the logical relationships between the selected keyword phrases, the keyword phrases may be dragged and dropped in different positions within search pane 340. For example to logically OR "german shepherd" with "dog:security" instead of with "doberman", the keyword phrase "german shepherd" may be dragged and dropped to a position preceding (above) "doberman".

In one embodiment of the present invention, it is possible to group keyword phrases under "concept headings". Concept headings are keyword phrases which serve as a shorthand expression for each of the keyword phrases associated with them. Thus, when a concept heading 'X' having constituent keyword phrases 'A', 'B' and 'C' is dropped into the INCLUDE logic pane, keyword phrases 'A', 'B' and 'C' become part of the query expression (though, in one embodiment, only the concept heading 'X' appears in the query pane). Furthermore, the logical association of keyword phrases that have been grouped under a concept heading dropped in the INCLUDE logic pane may be specified. For example, by repositioning the constituent keyword phrases relative to one another and by toggling between logical AND and logical OR operators, keyword phrases 'A', 'B' and 'C' may be related by: (A OR B) AND C; A AND (B OR C); and so on. Concept headings may be entered by the user or selected from the automatically generated list of keyword phrases.

Returning to FIG. 2, in one embodiment of the present invention, once a query expression is completely constructed, the user initiates a document search by placing the mouse cursor over Search button 255 and pressing a mouse button (i.e., clicking the Search button 255). After the search, the list of documents appearing in file list pane 220 is reduced to the subset of documents meeting the search criteria set forth in the query expression. Alternative embodiments, including one in which all of the documents remained in view, but with the subset of documents meeting the query expression indicated in some way (e.g., by highlighting or shading), would be within the spirit and scope of the present invention.

The document abstract pane 270 is used to present an abstract from a document identified based on the query expression constructed by the user. The identified document is a document meeting the logical criteria set forth in the query expression. In the example above, for instance, a document having keyword phrases A and B, but not E would be identified, as would a document having keyword phrase D, but not E. In one embodiment of the present invention, an abstract of the identified document is generated by first performing linguistic analysis on the document to identify concept sentences (i.e., sentences containing keyword phrases) and then combining the concept sentences. In an alternative embodiment, the document abstract is generated by linguistic analysis of the document separate from that used to identify keyword phrases. Keyword phrases, concept sentences, and a document abstract may be generated in a single linguistic analysis or in separate operations.

In one embodiment of the present invention, the user may select the document from which the abstract is generated by clicking on any one of the documents 221 listed in file list pane 220. In this way, a user can browse the abstract of each document identified by the query expression. In an alternative embodiment, an abstract from one of the identified documents could be presented automatically upon completion of a search for documents meeting the query expression. In any case, the document from which the abstract presented in abstract pane 270 is drawn may be opened by clicking the Open button 280.

In one embodiment of the present invention, the user is permitted to create multiple instances of dialog box 201, each presenting a list of keyword phrases, a list of documents and an abstract based on the same or different archive catalog as used to present dialog box 201. Also, several of the panes within dialog box 201, including the keyword pane 205, file list pane 220, search pane 240 and abstract pane 270, are resizeable to permit more or less information to be presented therein.

Linguistic Analysis

In the preferred embodiment of the present invention a commercially available linguistic analysis tool named Syntactica from Iconovex Corporation is used to linguistically analyze documents. Other linguistic analysis tools, including tools from Inference Corporation and others, may also be used. Linguistic analysis tools fall generally into one of two categories: referential analyzers and mathematical analyzers.

Referential analyzers, including Syntactica, perform paragraph by paragraph parsing of documents using dictionary definitions of words to identify grammatically and definitionally significant phrases (i.e., keyword phrases). Grammatically significant phrases are identified on the bases of syntactic analysis, in which syntactically necessary, but conceptually insignificant terms (such as conjunctions, articles, etc.) are removed. Identification of definitionally significant phrases is termed semantic analysis and involves reference to the dictionary definition of the terms constituting the phrase. Based on their grammatical and definitional significance relative to one another, the keyword phrases are assigned relevance codes. Syntactica, for example, assigns relevance codes from 1 through 6 to identified keyword phrases with 6 indicating highest relevance. In one embodiment of the present invention, these relevance codes are listed along with the keyword phrases to which they refer.

Referring to FIG. 2, the number of keyword phrases presented in the keyword pane 205 may be controlled by filtering the keyword phrases presented based on relevance code. Relevance rank selection buttons 217 are provided for this purpose. Clicking on the relevance rank selection button numbered "6", for example, results in the presentation of a highly selective and therefore reduced number of keyword phrases, each having a relevance code of 6. Clicking on the relevance rank selection button numbered "1", by contrast, results in a less selective, more extensive listing of keyword phrases having relevance codes of 1 or greater.

Based on the same linguistic analysis described above, Syntactica identifies concept sentences. Concept sentences are sentences containing keyword phrases. As with keyword phrases themselves, the selectivity with which concept sentences are defined may be controlled by user selection of a relevance filter by clicking a desired one of the abstract relevance rank selection buttons 275. By combining the identified concept sentences, an abstract of the document may be obtained.

Mathematical analyzers perform linguistic analysis by measuring the relative frequency of occurrence of words after they have been converted to stemmed words. A stemmed word is one which has been reduced to its root form by removing inflectional elements and otherwise truncating declensional and conjugative forms of the words (for example, reducing "shipped" to "ship", "devices" to "device" or "president's" to "president"). Those stemmed words or groups of stemmed words having a relatively high frequency of occurrence (i.e., high frequency of occurrence compared to other stemmed words), are considered to be keyword phrases. Relevance codes can be assigned to the stemmed words based on their relative frequency of occurrence.

Regardless of whether the referential or mathematical linguistic analyzer is used to parse documents, documents may first need to be converted from a specialized format into a format recognizable by the linguistic analysis tool. In one embodiment of the present invention, for example, certain types of data files are first converted to the standard file format known as "ASCII Plain Text" (ASCII) before being linguistically analyzed by Syntactica.

A Computer System for Performing the Method of the Present Invention

Figure 4:
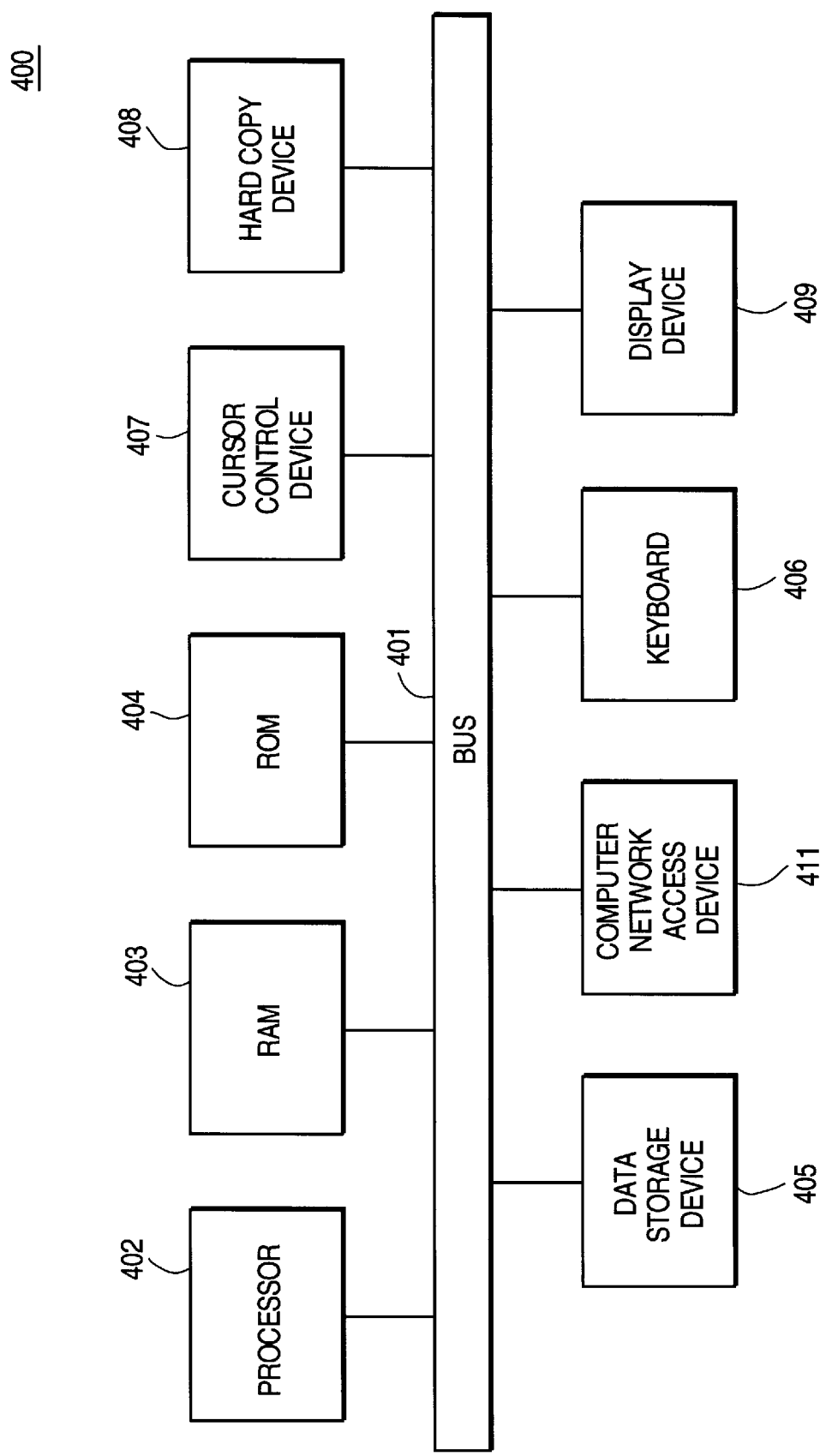
FIG. 4 illustrates a general purpose computer utilized to perform the method steps of the present invention.

In one embodiment of the present invention, an apparatus for performing the method steps described above includes the computer system 400 shown in FIG. 4. The present invention may be implemented on a general purpose microcomputer, such as one of the members of the Apple Macintosh family, one of the members of the IBM Personal Computer family, or one of several work-station devices which are presently commercially available. In any event, a computer system as may be utilized by the preferred embodiment generally comprises a bus 401 for communicating information, a processor 402 coupled with said bus 401 for processing information, a random access memory (RAM) or other storage device 403 (commonly referred to as a main memory) coupled with said bus 401 for storing information and instructions for said processor 402, a read only memory (ROM) or other static storage device 404 coupled with said bus 401 for storing static information and instructions for said processor 402, a data storage device 405, such as a magnetic disk and disk drive, coupled with said bus 401 for storing information and instructions, an alphanumeric input device 406 including alphanumeric and other keys coupled to said bus 401 for communicating information and command selections to said processor 402, a cursor control device 407, such as a mouse, track-ball, cursor control keys, etc., coupled to said bus 401 for communicating information and command selections to the processor 402 and for controlling cursor movement, and a display device 409 for receiving display data from the processor 402 and presenting the display data to the computer user. Additionally, it is useful if the system includes a hardcopy device 408, such as a printer, for providing permanent copies of information. The hardcopy device 408 is coupled with the processor 402 through bus 401.

Computer system 400 also includes a computer network access device 411 for connecting to a computer network such as the Internet. Computer network access device may be a modem, a network adapter module or any other device for connecting to a computer network.

In the preferred embodiment, the individual steps of the method of the present invention are performed by the above described general purpose computer components programmed with instructions that cause the processor 402 to perform the recited steps. However, the steps of the method of the present invention may also be performed by specific hardware components that contain hard-wired logic for performing the recited steps, or any combination of programmed general purpose computer components and custom hardware components. Nothing disclosed herein should be construed as limiting the present invention to a single embodiment wherein the recited steps are performed by a specific combination of hardware components.

Preferred Embodiment of the Improved User-interface

Figure 5:
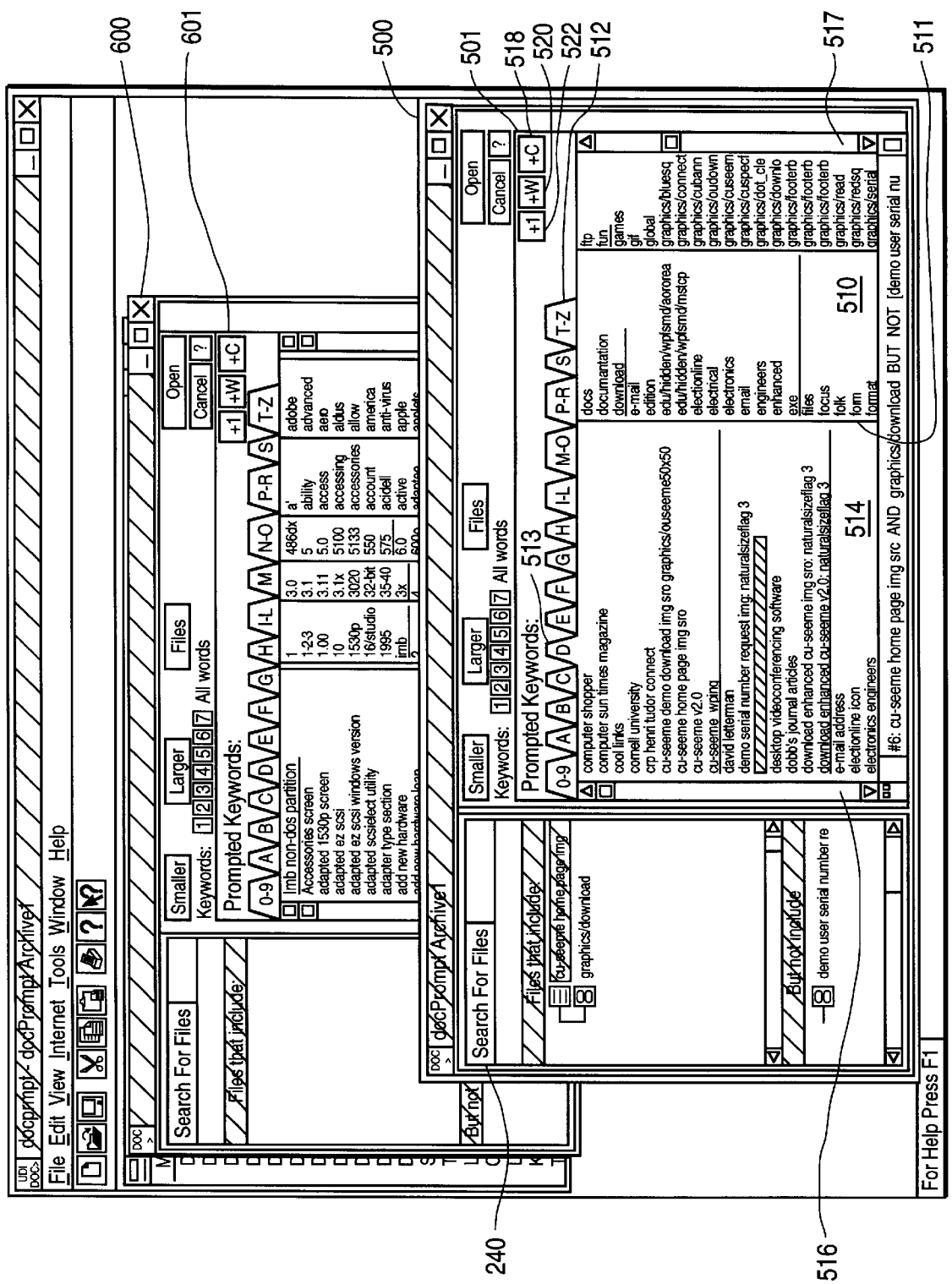
FIG. 5 depicts one embodiment of an improved user-interface showing a keyword and a key phrase window pane with dynamic index tabs.

FIG. 5 depicts an improved user-interface 500 allowing a computer user to identify one of a plurality of documents in accordance with the method described above. The user-interface 500 is presented to the user in response to a document select request such as a request to open a data file in a word processing or other text-intensive application. In the present invention, therefore, the user-interface 500 includes an automatically generated list of search terms, referred to as key words and key phrases, displayed in a keyword pane 501. The present invention improves upon the keyword pane 205 shown in FIG. 2 and described above. In the present invention, keyword pane 501 includes a key phrase area 514, a key word area 510, a tabbed index 512, and buttons 518, 520, and 522 for configuring the display of information in keyword pane 501. The listed key words in key word area 510 and key phrases in key phrase area 514 act to "prompt" the user to search for information of interest without requiring the user to explicitly conceive search terms. Thus, the present invention relieves the user from the burden of creating a document search expression, and instead permits the user to browse the relevant documents on the basis of the automatically generated key words and key phrases. The key words and key phrases listed in areas 510 and 514 prompt the user to construct a query expression via a drag and drop technique which is used to identify selected ones of the plurality of documents. As described above, any of the key words or key phrases shown areas 514 and 510 may be dragged and dropped into search pane 240 shown in FIGS. 2 and 5. Each of the areas 514 and 510 are separately scrollable using conventional vertical scroll bars 516 and 517, respectively.

Each of the areas 510 and 514 are dynamically sized to render visible the selected portion of the key words or key phrases. The areas 510 and 514 are separated by a dynamically placed separator 511. The position of separator 511 varies depending upon whether either or both key words and/or key phrases have been selected for display using buttons 518 and 520. If key words are selected for display in area 510 using button 520, the separator 511 shifts left to enlarge the display area 510 available for the display of key words. An example of this is shown in keyword pane 601 illustrated in FIG. 5. Separator 511 may also be shifted all the way over to the left margin of pane 501 thereby displaying only key words and selectively suppressing the display of key phrases. If key phrases are selected for display in area 514 using button 518, the separator 511 shifts right to enlarge the display area 514 available for the display of key phrases. Separator 511 may also be shifted all the way over to the right margin of pane 501 thereby displaying only key phrases and selectively suppressing the display of key words. The width of each of the areas 510 and 514 is dynamically adjusted based upon the width of the key words or key phrases currently being displayed in these areas. Thus, the text content is used to determine the display area size. Specifically, the width of area 514 is set to the width of the longest key phrase currently being displayed in area 514. An example of this is shown in FIG. 5. Once the width of area 514 is set based upon its content, the width of area 510 may be determined. Given the area 510 left over in keyword pane 501 after the width of area 514 is determined, key words may be displayed in a dynamically-created multi-column format to consume the available area 510. The width of each of the columns in this area is dynamically set to the width of the longest key word currently being displayed in that column. If areas 514 and 510 cannot be dynamically sized wide enough to render visible a long key word or key phrase, horizontal scroll bars are automatically inserted to render area 510 or 514 as a virtual view area into the key word or key phrase data. Additionally, the font of the text displayed in areas 510 and 514 can be dynamically modified to efficiently use the display area provided in these areas given the text content that must be displayed.

Beside each keyword and key phrase presented in areas 510 and 514, a relevance code 208 (shown in FIG. 2) of the keyword or key phrase may be selectively displayed. Button 522 is used to toggle on/off the display of this numerical information. As stated above, the key words and key phrases of the areas 510 and 514 are obtained by linguistically analyzing each of a plurality of documents and, in the preferred embodiment, relevance codes 208 are generated by the linguistic analysis.

Keyword pane 501 includes a tabbed index 512, which is used to select for display the key words or key phrases beginning with the letters or numbers on a corresponding selected tab of tabbed index 512. Referring again to FIG. 5, a tabbed index 512 is shown. Each tab of tabbed index 512 includes an alphanumerical symbol or symbols that correspond to the first letter of key words or key phrases displayable in keyword pane 501. Any one tab of tabbed index 512 may be selected using a conventional pointing device or mouse. Upon selection of a tab, the alphanumerical symbol on the tab is used as a search symbol. The key words and key phrases are searched for the first occurrence of a matching key word or key phrase that begins with the search symbol. If found, the matching key word or key phrase is displayed in area 514 for a matching key phrase and in area 510 for a matching key word. In one embodiment, the matching key word or key phrase is displayed at the top or first line in the area 510 or 514 and subsequent key words or key phrases are filled in beneath the first line. In an alternative embodiment, the matching key word or key phrase is displayed centered at the line in the middle of the area 510 or 514 and previous key words or key phrases are filled in above the matching centered key word or key phrase and subsequent key words or key phrases are filled in beneath the matching centered key word or key phrase. If a tab includes more than one alphanumeric character in a character sequence, the first alphanumeric character in the sequence is used as the search symbol.

In the example shown in FIG. 5, a tab 513 labeled "D" has been selected by a user. In this case, the letter "D" becomes the search character. In response to this selection, the present invention has searched the set of previously generated key words and has displayed the first matching key word beginning with the search symbol "D" in area 510. In this example, the matching key word is displayed in the first line of the area 510. Also in response to the selection, the present invention has searched the set of previously generated key phrases and has displayed the first matching key phrase beginning with the search symbol "D" in middle line of area 514. Other key phrases are filled in around the matching key phrase. In addition, the portion of a line segment displayed underneath the tabbed index 512 at the selected tab 513 is removed to indicate this tab has been previously selected. In areas 514 and 510, horizontal line segments are inserted in the text to mark the transition between groups of key words or key phrases having a common first symbol to a next group of key words or key phrases having a next common first symbol. In the preferred embodiment, the key words and key phrases are sorted alphanumerically.

The alphanumerical symbol or symbols on the tabs of tabbed index 512 are dynamically generated based upon the content of the key words or key phrases they represent. These tab symbols are dynamically generated from the key word and key phrase content in the following manner.

First the key word and key phrase content is scanned to determine the first alphanumeric character appearing for each key word and key phrase. Next, the total number of key words and key phrases beginning with the same alphanumeric character are tallied for each alphanumeric character. The average number of key words and key phrases beginning with the same alphanumeric character is then computed. Groups of sequential alphanumeric characters are collected such that the total number of key words and key phrases beginning with the alphanumeric characters from the group approaches the average previously computed. In some cases, a single alphanumeric character may have enough key words and key phrases beginning with that alphanumeric character that the total for that alphanumeric character approaches the average previously computed. In other cases, a group of alphanumeric characters must be collected to have enough key words and key phrases beginning with those alphanumeric characters so the total for that group of alphanumeric characters approaches the average previously computed. Once these single alphanumeric characters or groups of alphanumeric characters are determined, the single alphanumeric character symbol or symbols representing the groups of alphanumeric characters are inserted into the tabs of the tabbed index shown by example in FIGS. 5–7.

Figure 6:
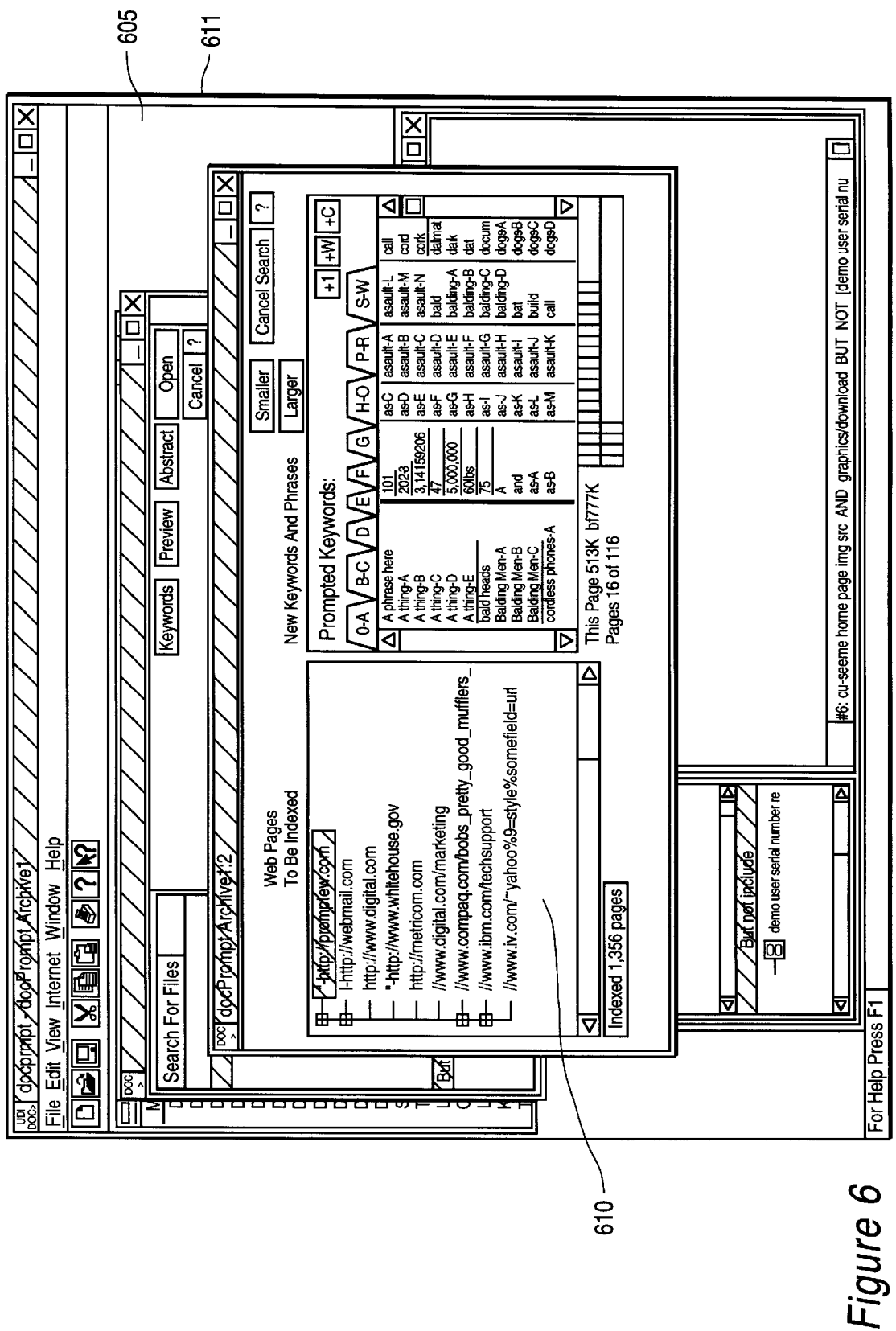
FIG. 6 depicts one embodiment of the improved user-interface showing WWW web pages.

In an alternative embodiment of the present invention, the archive catalog may be a collection of documents residing at arbitrary sites on the World Wide Web (WWW). These documents or pages may be accessed and referenced using their conventional Universal Resource Locator (URL). Referring now to FIG. 6, a web page list 610 is included in window 605. Web page list 610 includes a URL for each of the WWW resident documents in the archive catalog for the present invention. In the manner described above, the key words and key phrases of the areas 510 and 514 are obtained by linguistically analyzing each of the plurality of documents from the archive catalog. In this alternative embodiment, these documents are web pages identified in web page list 610. In a manner similar to the linguistic analysis performed on locally resident files, the web pages are scanned for key words and key phrases. These Web resident key words and key phrases are then displayed in prompted keyword pane 611. The keyword pane 611 operates in the same way as keyword pane 501 described above in connection with FIG. 5.

The URLs displayed in web page list 610 are organized in a hierarchical fashion. In a manner similar to the conventional hierarchical organization of documents or files within folders or directories, the present invention displays a hierarchical organization of web pages within web sites. The full list of web pages for a particular web site may be expanded and displayed in area 610 by selecting the boxed plus sign symbol provided in one embodiment of the present invention.

Figure 7:
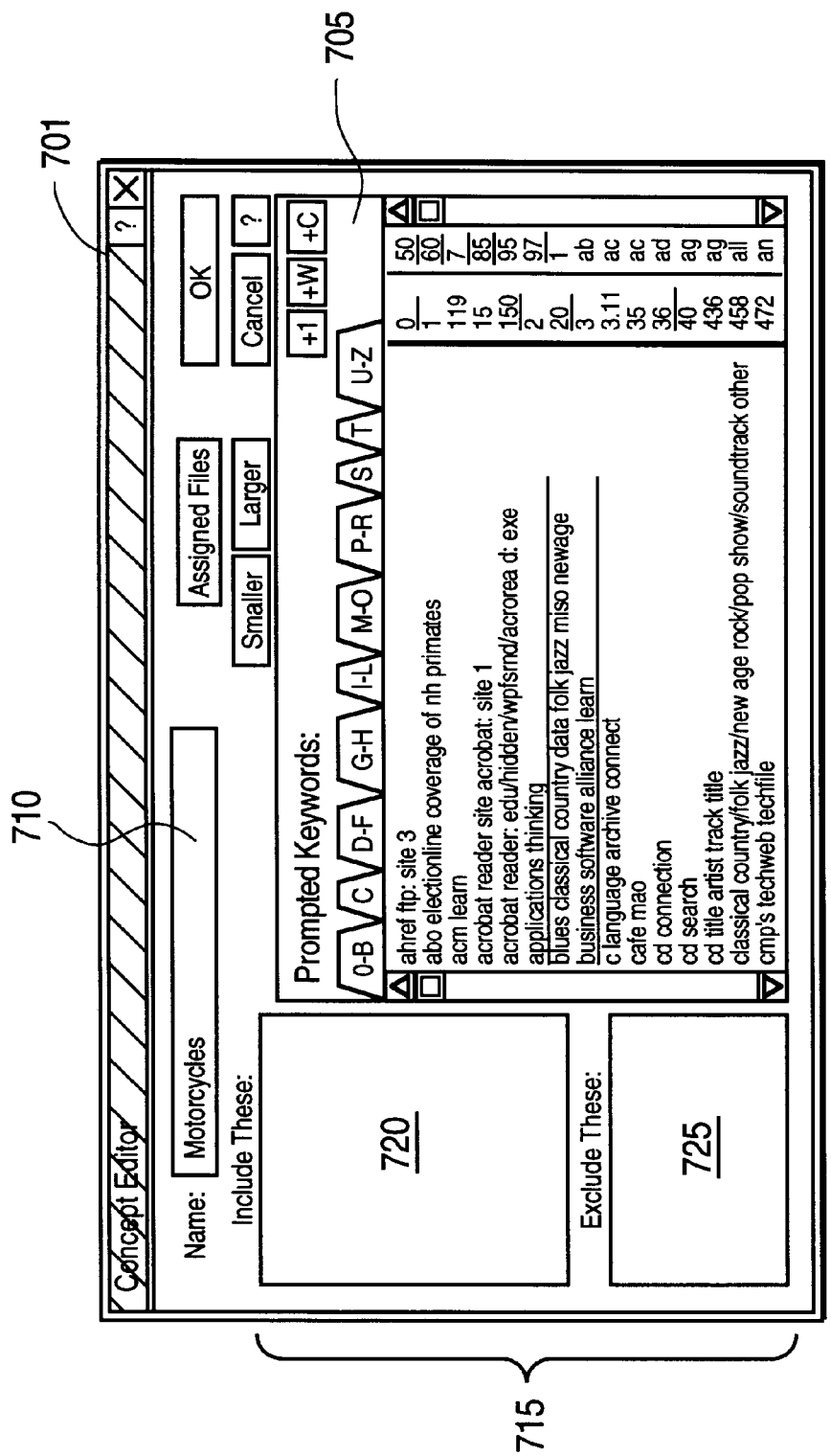
FIG. 7 depicts one embodiment of the improved user-interface showing the concept editor of the present invention.

Referring now to FIG. 7, the present invention also includes a concept editor. The concept editor is used to create a hierarchy in the specification of search terms or key words and key phrases. Using the concept editor of the present invention, a set of related key words or key phrases may be grouped together under a single concept identifier. The concept identifier may then be used to specify a search for any of the related key words or key phrases that the concept identifier represents.

FIG. 7 illustrates a window 701 which is used to control the concept editor. Window 701 includes a keyword pane 705. Keyword pane 705, as described above, provides a means for displaying and indexing into a plurality of key words and key phrases associated with a collection of archive documents or WWW pages. Any one or more of these key words and key phrases may be selected, dragged, and dropped into other display areas using conventional means. Window 701 also includes a concept specification area 715 including an "include" area 720 and an "exclude" area 725. These areas are used for specifying the items included or excluded from the set of related key words or key phrases grouped together under a single concept identifier. These areas are used in the manner described below.

Window 701 also includes a dialog box 710 with which a user may enter the name of a concept identifier that represents the set of related key words or key phrases grouped together under the specified name. In the example of FIG. 7, a user has entered the concept identifier name "Motorcycles". The user may now drag and drop key words or key phrases from keyword pane 705 into either include area 720 or exclude area 725. In this example, it is anticipated that a user would drag and drop text items related to the concept identifier name "Motorcycles"—perhaps make/model information or specifications for specific types of motorcycles. Items dropped into area 720 will qualify a subsequent search to require matching text include one or more of these items. Items dropped into area 725 will qualify a subsequent search to require matching text not include any of these items. In this manner, a complex keyword query may be specified and represented by the concept identifier. In a subsequent search of archive documents or WWW pages, a user need only enter the concept identifier and the query it represents is automatically configured.

Concept identifiers may also be hierarchically created. A previously created concept identifier may be dragged and dropped into the specification area 715 of a subsequently created concept identifier. In this manner, the specification of a concept identifier may include other concept identifiers. For example, a user may create a concept identifier "Motor Vehicles". The previously created concept identifier "Motorcycles" may be dragged and dropped into area 720 when the concept identifier "Motor Vehicles" is created. Other key words, key phrases, or concept identifiers may be dragged and dropped in to area 715 as well. Concept identifiers may thereafter be dragged and dropped into search pane 240. Thus, a very complex and hierarchical query structure may be created using the concept editor of the present invention.

In addition, the concept editor of the present invention also allows the creation of logical expressions or query expressions which can include key words, key phrases, and other previously defined concept identifiers. The key words, key phrases, and other concept identifiers that define a concept identifier may be combined into a logical expression using "AND", "OR", and "NOT" operators. These operators are well known to those of ordinary skill in the art. The concept identifier may therefore be used to represent a logical expression.

The concept identifier and the logical expression that it represents may be conveniently used for document search and query operations.

There are many applications for the concept identifier feature of the present invention. For example, one of the important features of the Internet is subscription to various alt.newsgroup services. A newsgroup subscriber receives periodic updates through electronic mail. The concept editor of the present invention may be used to create a compound concept identifier representing a logical expression that defines the particular newsgroup content of interest to a particular subscriber. Using this concept identifier, the subscriber may conveniently browse for his/her specific areas of interest or an automatic browse and capture function may be activated.

Improved Method for Obtaining an Initial Document Set

As stated above, the method of the present invention can be applied to analyze documents on the World Wide Web (the "web"). The World Wide Web is a vast collection of documents, called web pages, that have been formatted in Hypertext Markup Language (HTML) and linked together using an HTML construct called hypertext. Hypertext is a character string accompanied by a Universal Resource Locator (URL, described above). Computer programs known as "browsers" can be used to view web pages and allow users to dereference hypertext links to "travel" to the web page indicated by the link's URL. From the perspective of the browser user, the World Wide Web is an enormous data object that can be viewed one web page at a time by following hypertext links.

A fundamental characteristic of the web is that its linked web pages are distributed among a large number of independently-controlled, networked computers referred to as "web sites". As a result, the vast amount of data on the web has virtually no organizational structure beyond that of individual web pages.

To make information on the web more accessible, a number of web sites include search engines that can be used to find web pages containing text consistent with a search expression. A search engine is a computer program which, when executed, accepts a search expression entered by a remote user (usually through a browser), then inspects web pages looking for content consistent with the search expression. If a web page contains text consistent with the search expression, the URL of the web page is logged in the search engine and ultimately returned to the remote user. In many cases the search expression simply a character string, but the search expression may also include Boolean operators (AND, OR, NOT).

Even with the benefit of a search engine, a computer-user browsing the web can spend hours sifting through web page content before happening upon something of interest. This is especially true when the user has only a broad idea of the information sought. For example, suppose one is interested in luggage and decides to look for descriptions of luggage on the web. The first step would be to submit the term "luggage" to a search engine and wait for the search engine to return URLs. At this point the user is faced with reading through potentially hundreds of web pages only a few of which may contain luggage descriptions. Moreover, depending on the volume of traffic on the web and the number of URLs the search engine is configured to find in a given search, there can be a significant delay while the search engine completes its search.

The present invention can be used to much more efficiently browse the content of web pages thereby allowing users to quickly focus on pages of interest.

Figure 8:
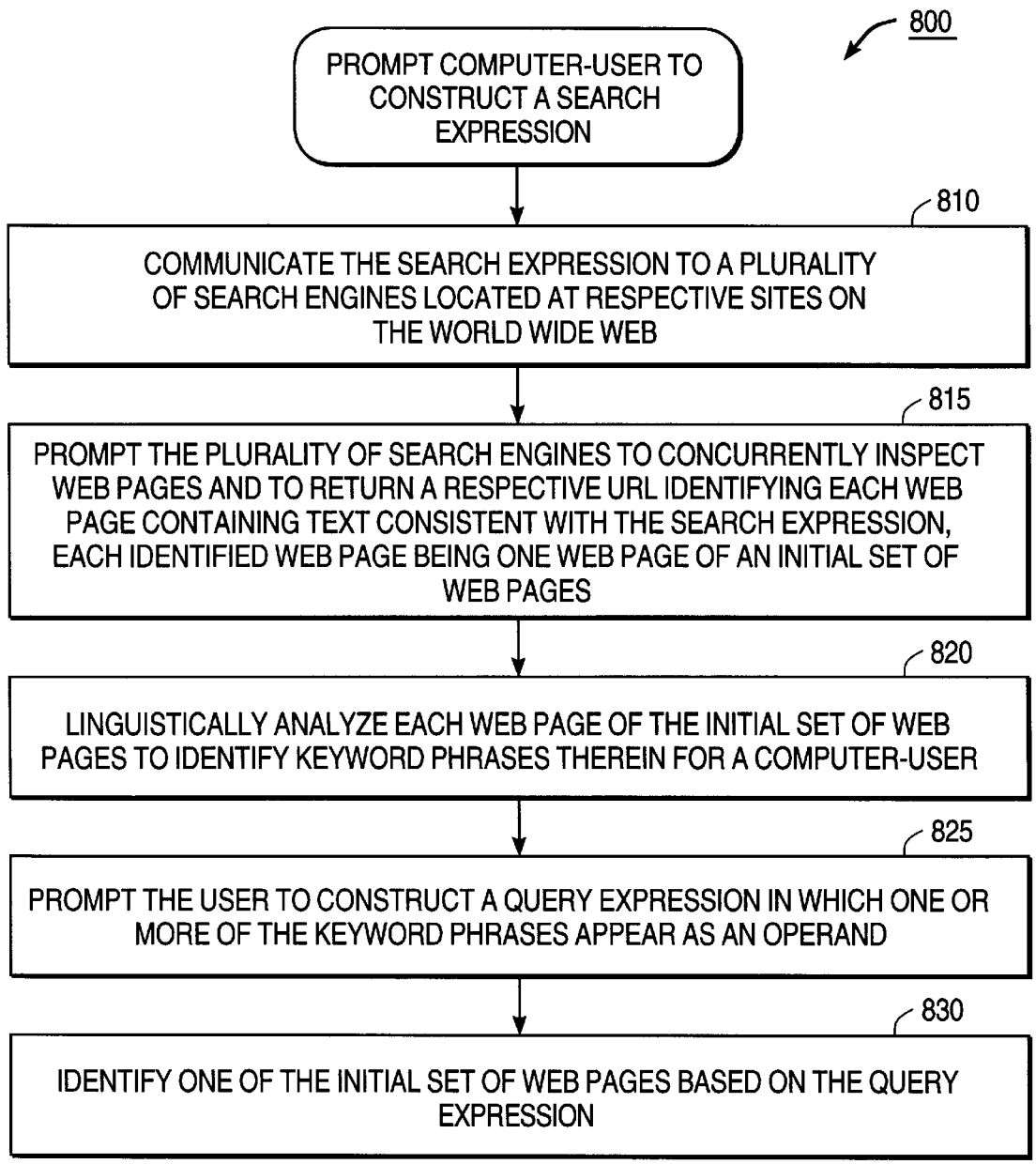
FIG. 8 illustrates a method for identifying one of a plurality of web pages on the World Wide Web.
Figure 9:
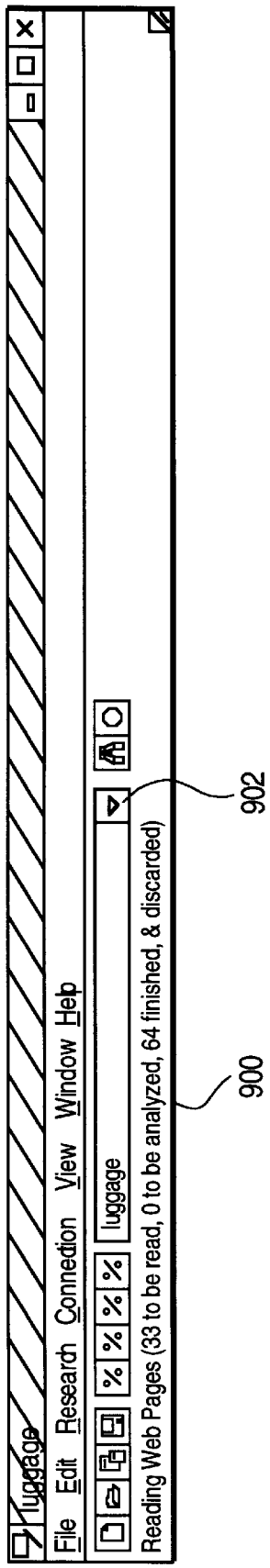
FIG. 9 depicts a Control window used to display a search expression constructed by a computer-user.

FIG. 8 illustrates a method for identifying one of a plurality of web pages on the World Wide Web. At step 805, a computer user is prompted to construct a search expression. The user may either construct the expression from a previously generated list of keyword phrases or simply type the expression. For example, FIG. 9 depicts a Control window 900 used to display a search expression constructed by the user, in this case, the term "luggage". In the one embodiment of the present invention, the Control window 900 includes a history button 902 that can be used to recall previously constructed search expressions.

Returning to method 800, at step 810, the search expression is communicated to a plurality of search engines located at remote web sites. Then, at step 815, the search engines are each prompted to concurrently inspect web pages to identify an initial set of web pages containing text consistent with the search expression and to return a respective URL for each of the identified web pages. By prompting multiple search engines to concurrently identify respective sets of web pages, the search engines are made to process search requests in parallel to accelerate the web search.

It will be appreciated that the steps 810 and 815 of method 800 can be performed sequentially or in an interleaved manner. That is, the search expression could be communicated to each of the search engines before any one of the search engines is prompted to perform the search, or each search engine could be prompted to perform the search immediately after receiving the search expression and before the search expression is communicated to the next search engine. Either way, so long as searching is performed by the prompted search engines concurrently, the advantage of parallel processing is achieved.

As discussed above, the present invention may be embodied in program code that can be executed by a processor. In one embodiment of the present invention, a number of views of information are made available to the user in windows displayed by an executing application program. These views are an alternative to several of the data presentation techniques discussed above.

Figure 10:
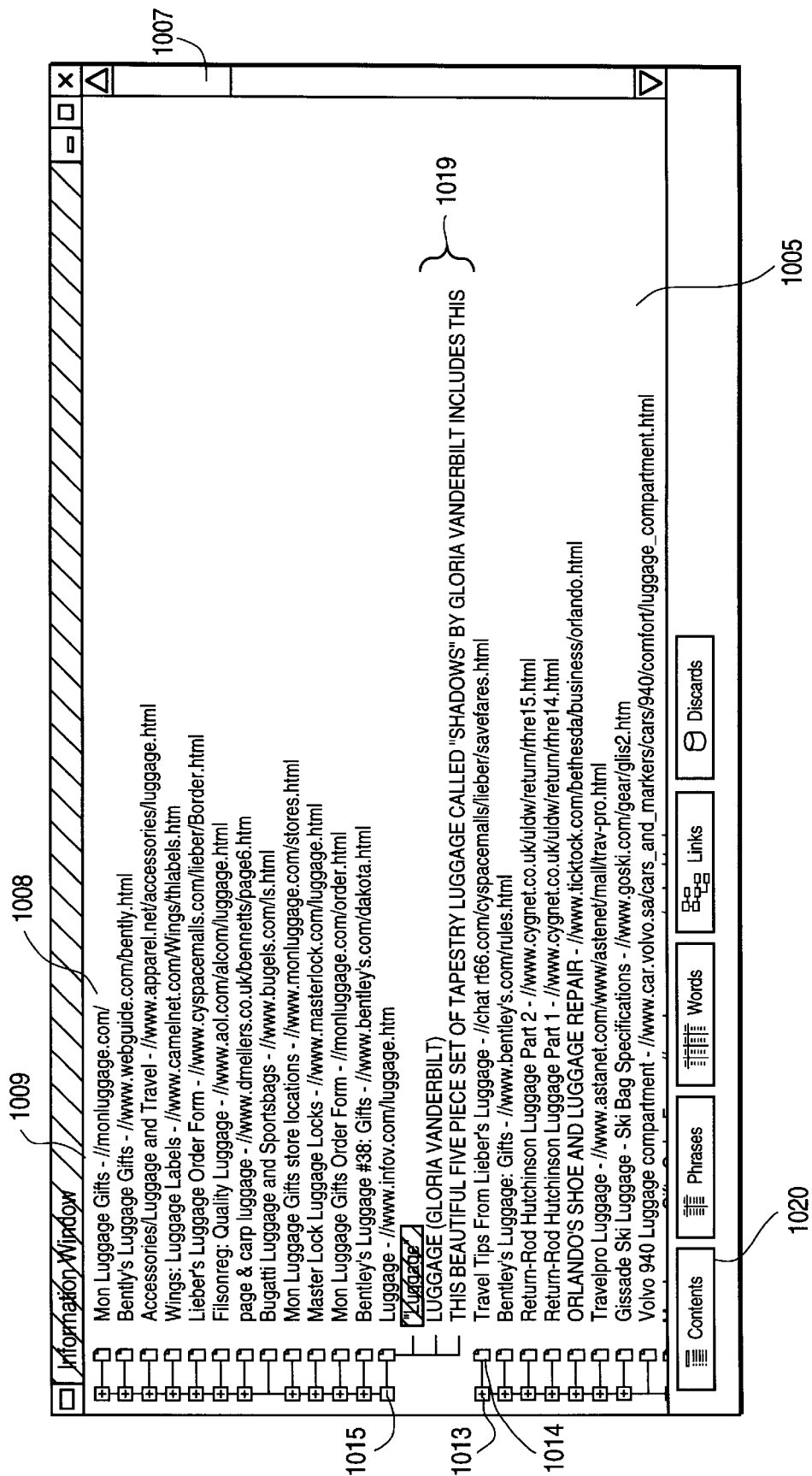
FIG. 10 depicts a Contents View window used to display URLs returned by web searching engines.

FIG. 10 depicts a Contents View window 1005 used to display URLs returned by the search engines prompted in step 815 of method 800. Redundantly returned URLs (i.e., URLs already found by another search engine) are removed so that a filtered and relatively comprehensive set of web pages is identified and presented in Contents View 1005. The set of web pages corresponding to the URLs presented in Contents View 1005 is referred to as the initial set of web pages. Contents View 1005 can be scrolled in the conventional manner using scrollbar 1007 to view URLs below the virtual window and is selected by clicking Contents tab 1020. In one embodiment of the present invention, each URL (identified by a text string beginning with "l//") is displayed adjacent the title information taken from the corresponding web page. For example, the URL "//moriluggage.com/" 1008 is displayed adjacent the web page title "Mori Luggage Gifts". Also, a "+" icon (e.g., icon 1013) is displayed adjacent each URL to indicate that web page sentences and titles matching the search expression may be viewed. When clicked with a mouse or similar cursor control device, the "+" icon is changed to a "−" icon (e.g., icon 1015) and web page text matching the search expression is displayed as indicated by 1019.

Returning to the method of FIG. 8, at step 820, each of the web pages in the initial set of web pages is linguistically analyzed to identify keyword phrases therein. In one embodiment of the present invention, this is accomplished by downloading and linguistically analyzing the contents of each web page concurrently with the ongoing search initiated in step 815. In step 825, the computer user is prompted to construct a query expression in which at least one of the keyword phrases is an operand, and in step 830, the query expression is used to identify one web page of the initial set of web pages.

Figure 11:
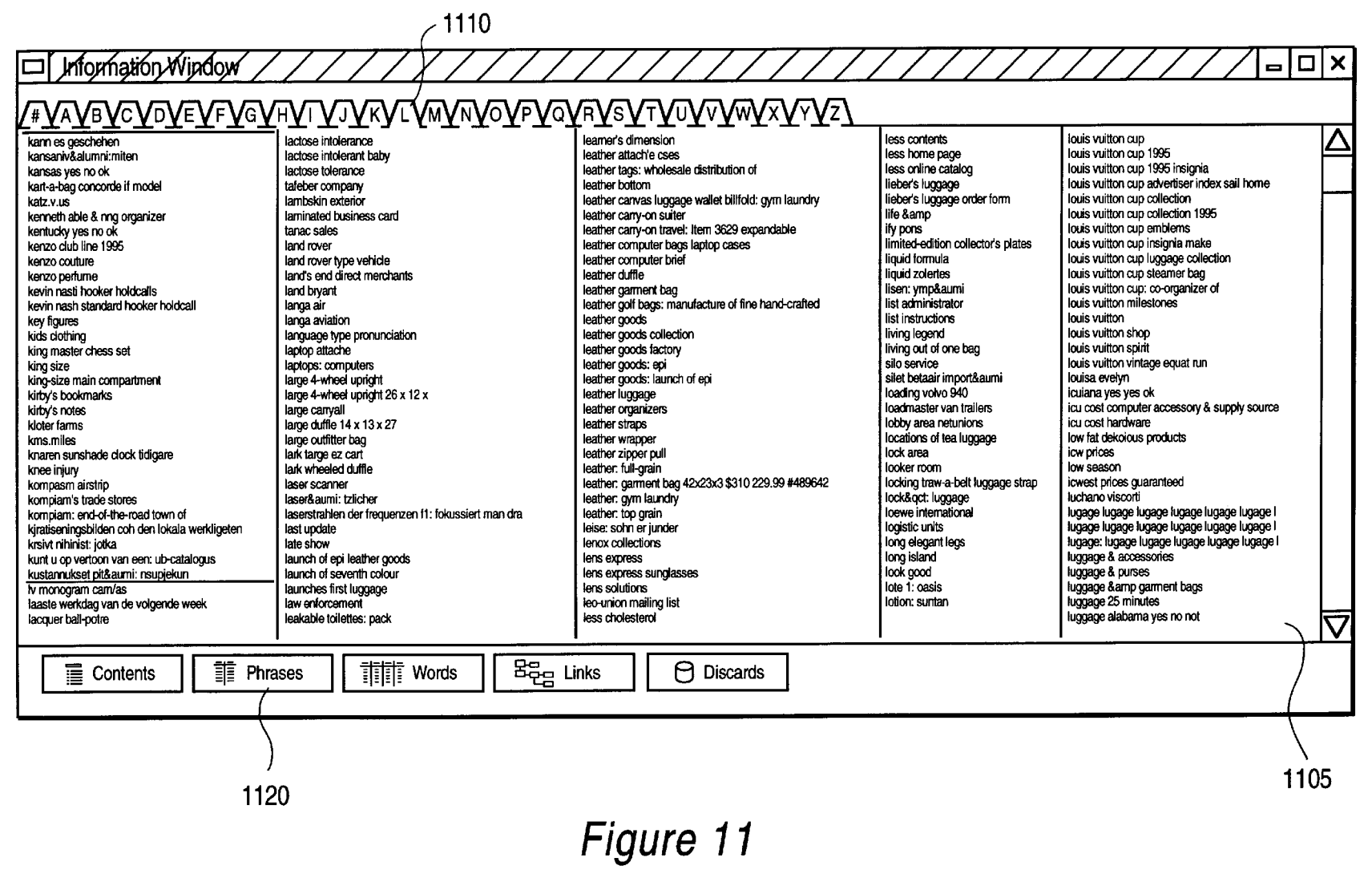

As shown in FIG. 11, the keyword phrases extracted from each analyzed web page are displayed in a navigable cross-index in a Phrases View window 1105 that a set of alphabetical tabs 1110 to allow a user to select a virtual window into the overall list of keyword phrases according to the first letter of the keyword phrase of interest. Herein the expression "cross-index" refers to an alphabetized listing of references found in more than one document. The index displayed in phrases view 1105 is a cross-index because it contains keyword phrases found in more than one of the analyzed web pages. In one embodiment of the present invention, keyword phrases found in more than one web page are displayed in a different color than those found in only one web page. This allows the user to quickly identify common themes among the initial set of web pages. The user is able to navigate the index of keyword phrases either by clicking one of the alphabetical tabs 1110 or by clicking one of the indexed keyword phrases. If the user clicks a keyword phrase indicated to have been found in only one of the analyzed web pages (i.e., a unique keyword phrase), an abstract of the corresponding web page is presented to the user in an abstract view (discussed below). In one embodiment of the present invention, the abstract has been previously generated based on linguistic analysis of the web page. If the user clicks a non-unique keyword phrase (i.e., a keyword phrase found in more than one of the analyzed web pages), a list is presented identifying web pages in which the keyword phrase has been found. In one embodiment of the present invention, the user may select a web page from the list by moving the mouse cursor over a listed web page. A previously generated abstract corresponding to the selected web page is then displayed. The Phrases View 1100 is selected by clicking the Phrases tab 1120.

Figure 12:
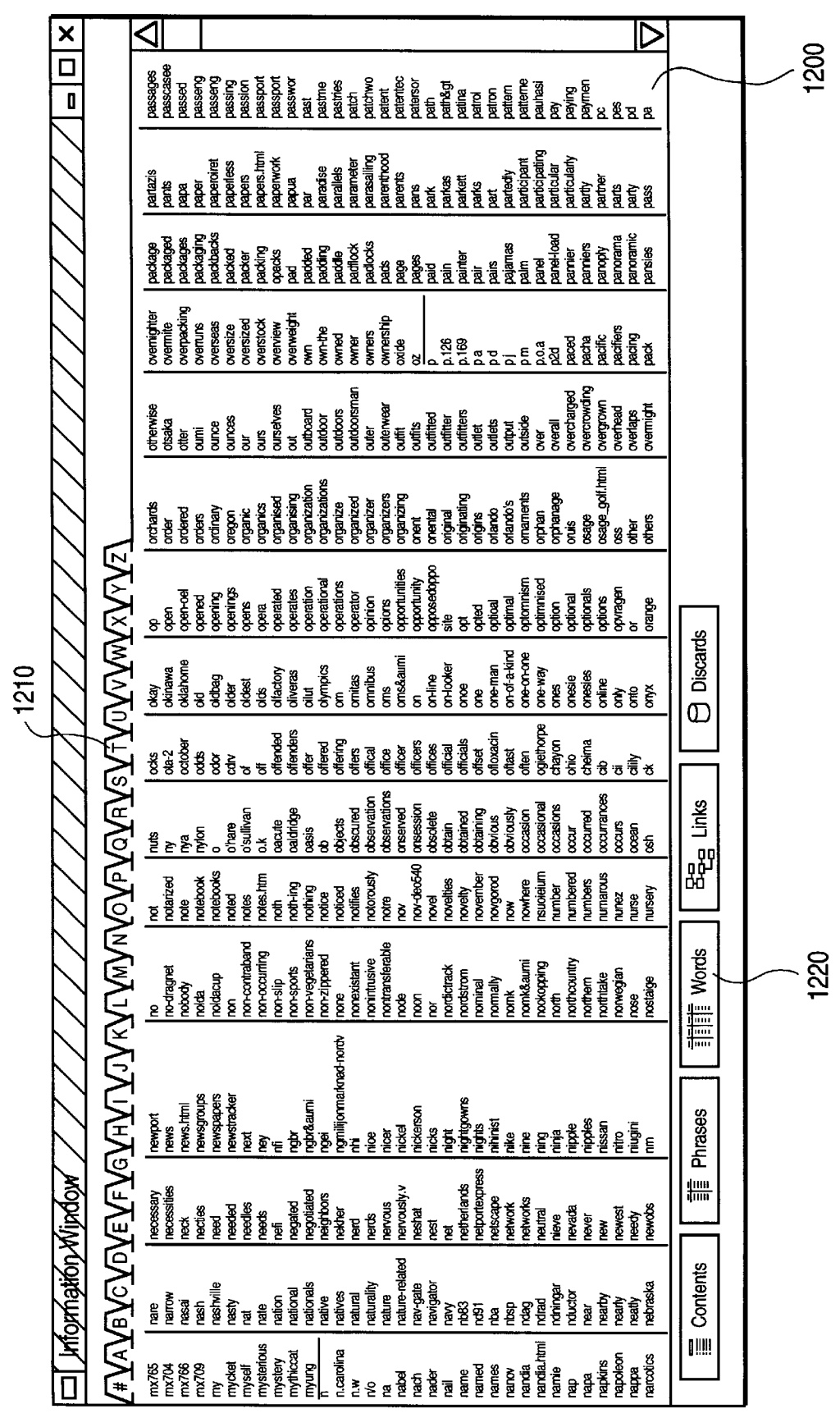

FIG. 12 depicts a Words View window 1200 that allows a user to view the keywords extracted from the initial set of web pages. Words View 1200 is selected by clicking the Words tab 1220. Like the Phrases View 1100, the Words View 1200 includes an alphabetically tabbed, navigable cross-index 1210 and keywords found in more than one web page are displayed in a different color than those found in only one web page. It will be appreciated that other techniques may be used to distinguish unique keywords or keyword phrases from non-unique keywords or keyword phrases without departing from the spirit and scope of the present invention.

Figure 13:
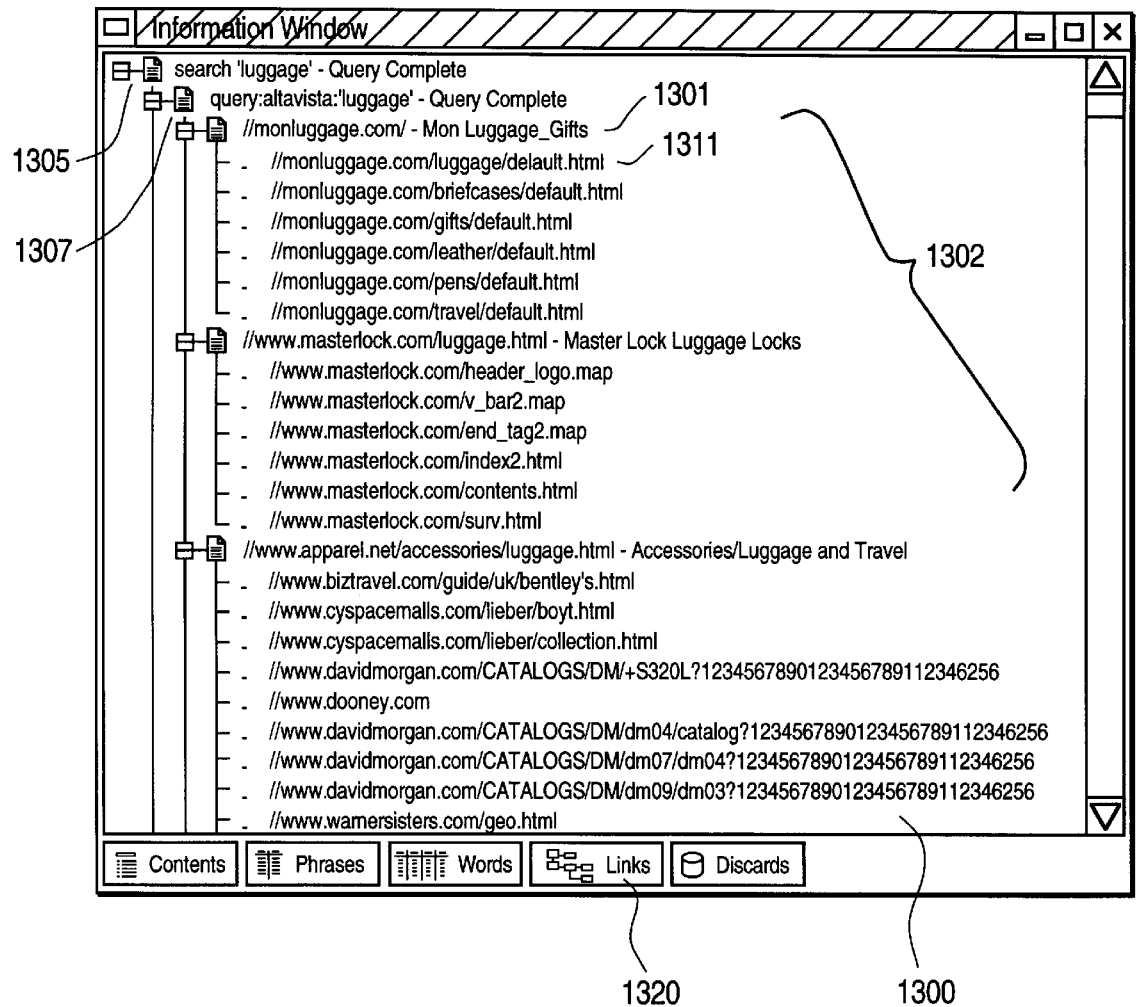
FIG. 13 depicts a Links View window used to display search expressions, search engine expressions and web page URLs.

FIG. 13 depicts a Links View window 1300 that allows a user to view a search tree 1302 resulting from the execution of the method 800 of the present invention. The initial search term entered in the Control window 900 is displayed at the root 1305 of the search tree 1302 (in this case, the term "luggage"). The next branch below the root 1305 of the search tree 1302 contains search expressions indicating the user-specified search term and the search engine to which the search term is to be communicated. An example of this type of expression, referred to herein as a "search engine expression", is shown at 1307. Search engine expression 1307 indicates that the term "luggage" is to be communicated to the AltaVista search engine.

Web pages identified by a search engine are listed below the search engine expressions in Links View 1300 in hierarchical order. For example, a first level page containing text consistent with the search expression and found by the AltaVista search engine is shown at 1309 of Links View 1300. Similarly, a second level web page found by the AltaVista search engine by following a hyper-text link in the first level web page is shown at 1311 of Links View 1300. Links View 1300 is selected by clicking the Links tab 1320.

Figure 14:
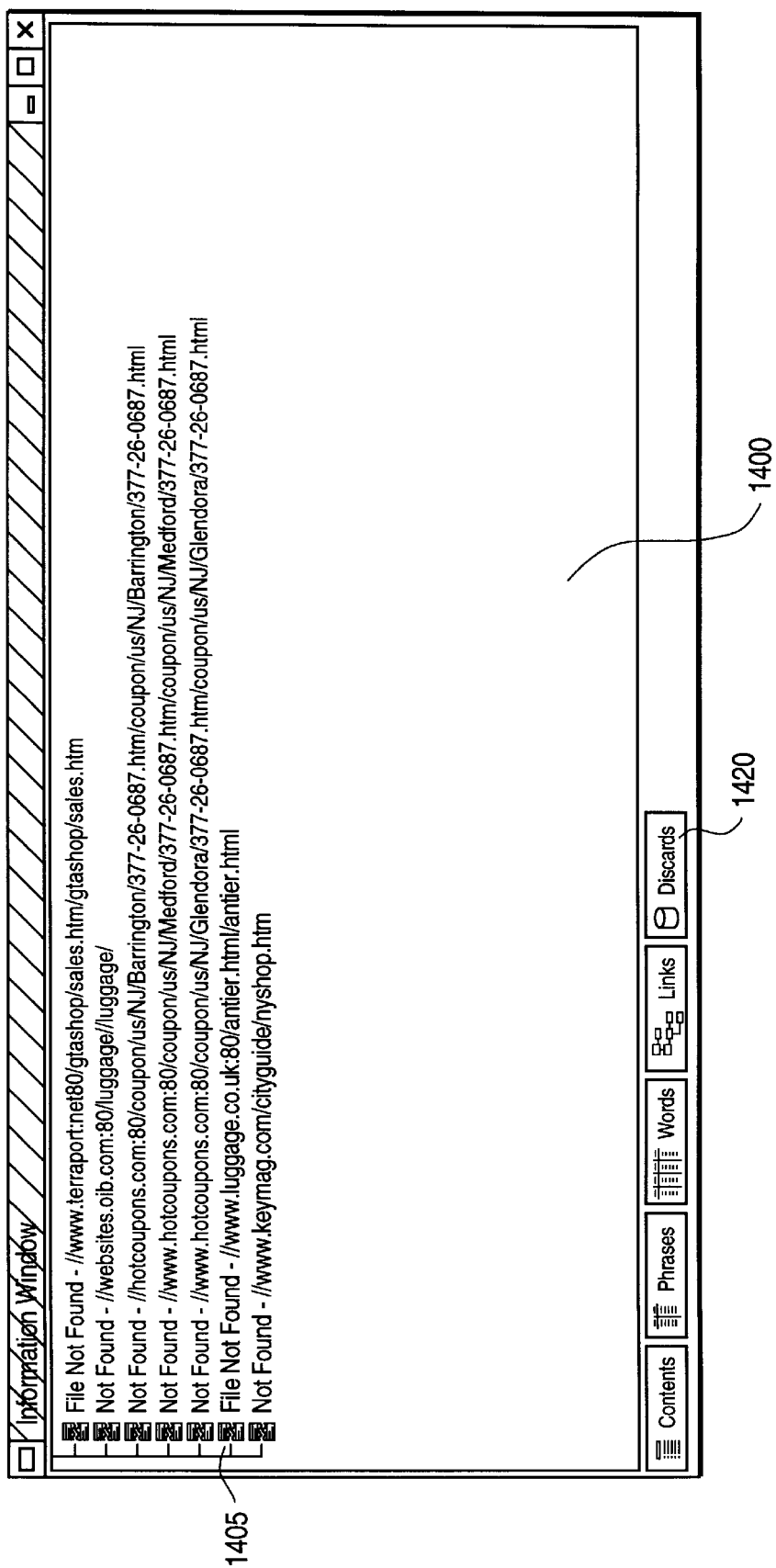
FIG. 14 depicts a Discards View window used to display the URLs of web pages in the initial set of web pages that were not available for download.

FIG. 14 depicts a Discards View window 1400 used to display the URLs of each of the web pages identified by the search engines in step 815 of method 800 that could not be downloaded. The unavailability of a web page is indicated by a torn web page icon (e.g., 1405) displayed adjacent each URL listed in the Discards View 1400. Discards View 1400 is selected by clicking Discards tab 1420.

Figure 15:
FIG. 15 depicts an Abstract window used to display an abstract of a web page.

FIG. 15 depicts an Abstract window 1500 used to display an abstract of the web page identified in step 830 of method 800. A web page abstract may also be selected by clicking a web page icon (or URL) in the Contents View 1000. In one embodiment of the present invention, an abstract is generated for each web page of the initial set of web pages and then the web page is discarded. This way, system memory is conserved. The user may recall the full web page if desired. Each abstract is generated based on concept sentences identified in the web page as described above.

In an alternative embodiment, the initial set of web pages can be saved and then queried in a second level query. For example, a new search expression may be entered, but rather than searching the web for new pages related to the search expression, the initial set of web pages previously obtained can be searched using the new search expression. In one embodiment of the present invention, previously downloaded pages matching the search expression are displayed in the Contents View window (FIG. 10, discussed above) while previously downloaded pages not matching the search expression are routed to the Discards View (FIG. 14, discussed above). This feature of the present invention, referred to herein as "document filtering", allows the initial set of web pages to be shuffled between the Contents and Discards views with each new search expression, depending on whether the web pages contain expression-matching text.

One application for document filtering is electronic mail sorting. Computer users receive electronic mail from many sources (e.g., co-workers, internet contacts, newsgroups) and in ever-increasing volume. The present invention can be used to download and analyze electronic mail files stored on a network mail server in a manner similar to the way web pages are downloaded and analyzed. In one embodiment of the present invention, different dynamic link libraries are provided to support electronic mail message download from different electronic mail servers. Copies of electronic mail messages are downloaded from the server and then analyzed to generate lists of keyword phrases and keywords, and, for each mail message, an abstract. The user can then enter search expressions to shuffle the different mail messages between the Contents View window and Discards View window as described above. The user may also view mail message abstracts. Thus, the present invention provides a computer-user with a powerful technique for sorting through mail by content without having to open and read each message. Later, after messages of interest have been sorted from the rest, they can be opened and read in the usual manner.

The application program of the preferred embodiment includes a number of options that can be set by the user to control the generation of the initial set of web pages and the presentation of data in the various views. These options are presented in a number of options windows discussed below.

Figure 16:
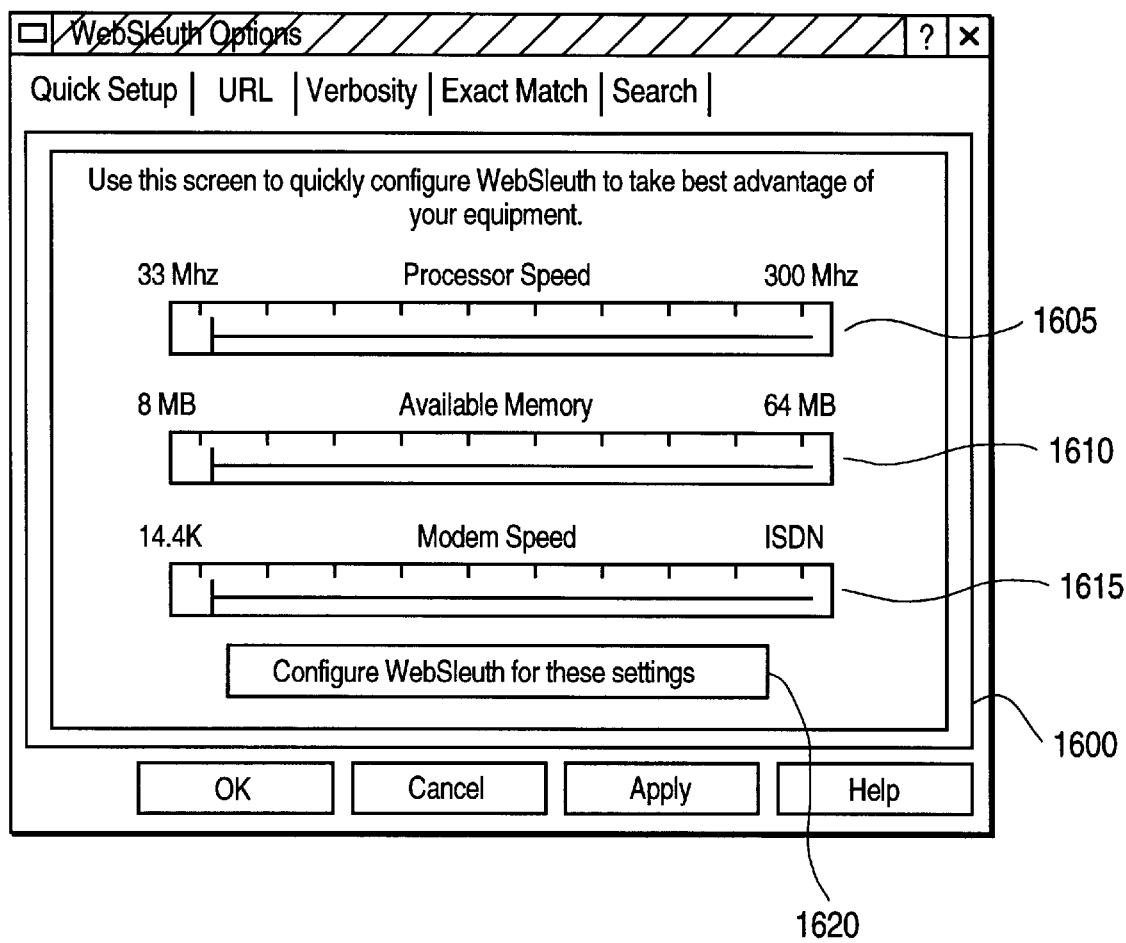
FIG. 16 depicts a Quick Setup options window used to allow a computer-user to specify characteristics of a host computer.

FIG. 16 depicts a Quick Setup options window. The Quick Setup window allows a user to describe characteristics of the host computer to allow an application program to automatically determine certain configuration parameters. Such configuration parameters include the number of search engines to be concurrently executed to determine an initial set of web pages, the maximum number of web agents that can be invoked to manage search requests and other tasks, and the volume of data displayed in the information views. In embodiment depicted in FIG. 16, the computer-user is prompted to specify the processor speed via slide bar 1605, the amount of core memory via slide bar 1610 and the modem speed via slide bar 1615. After these characteristics have been specified, button 1620 is clicked and the configuration parameters considered to best match the host computer's capabilities are selected. It will be appreciated that in an alternative embodiment, the application program could query system resources to determine the host computer's characteristics.

Figure 17:
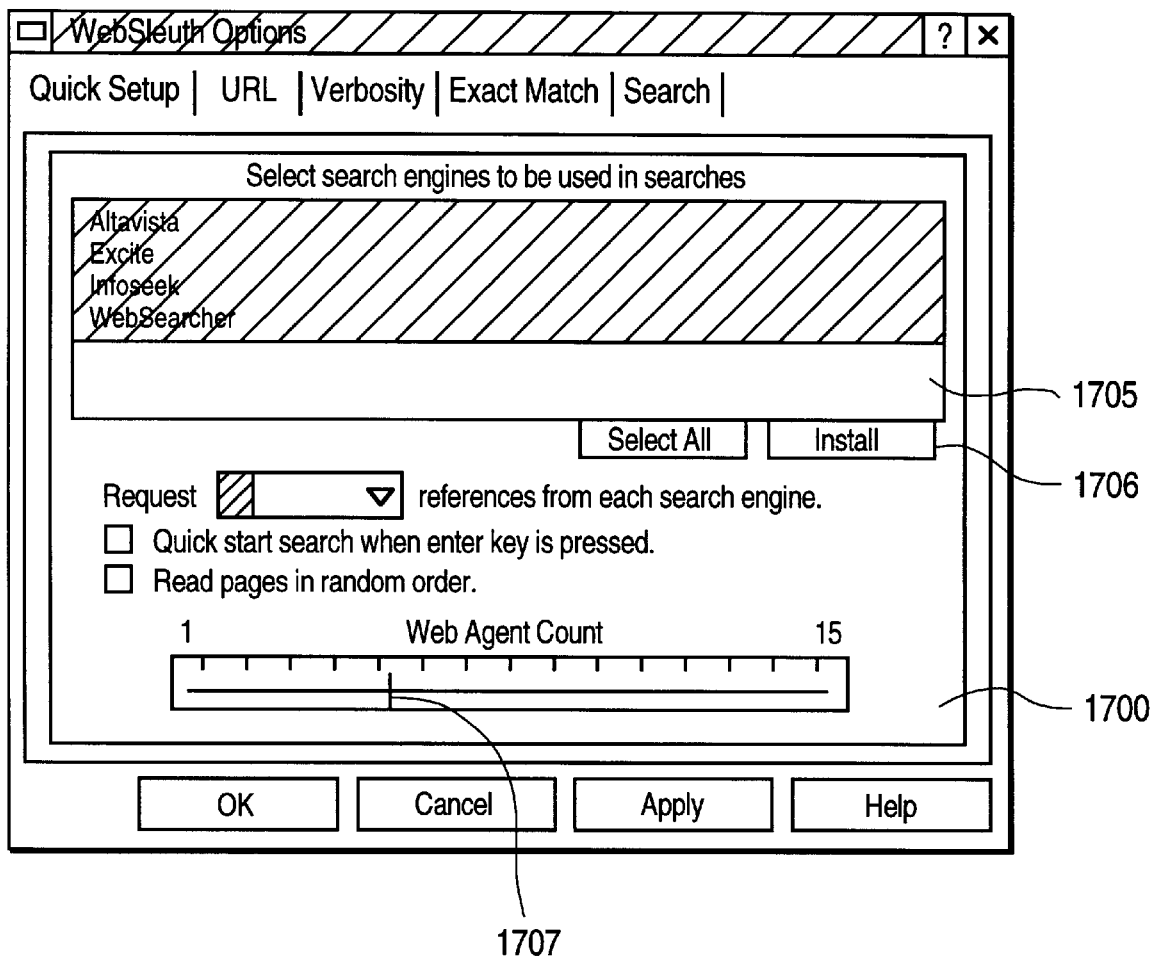
FIG. 17 depicts a Search options window used to allow a computer-user to specify the web searching engines to be used to identify an initial set of web pages.

FIG. 17 depicts a Search options window 1700 that can be used to specify the web searching engines to be used to identify the initial set of web pages and to specify the number of web pages to be located by each search engine in a given search. A list of search engines appear by default in the search engine selection window 1705. The user can add to this list and then select from among the listed search engines by pressing install button 1706 while a listed engine is highlighted. Each installed search engine will be used to identify web pages as described in steps 810 and 815 of method 800.

Slide bar 1707 may also be adjusted by the user to indicate the maximum number of web agents that may be concurrently executed to manage search operations and other tasks. Web agents are discussed in greater detail in reference to FIG. 18 and FIG. 19.

Other options that can be specified by the user include search filter parameters that can be used to filter web pages that do not exactly match the search expression from the initial set of web pages, verbosity settings for indicating the maximum number of words in a keyword phrase or in an abstract and settings to control the manner in which text is displayed in the various views.

Figure 18:
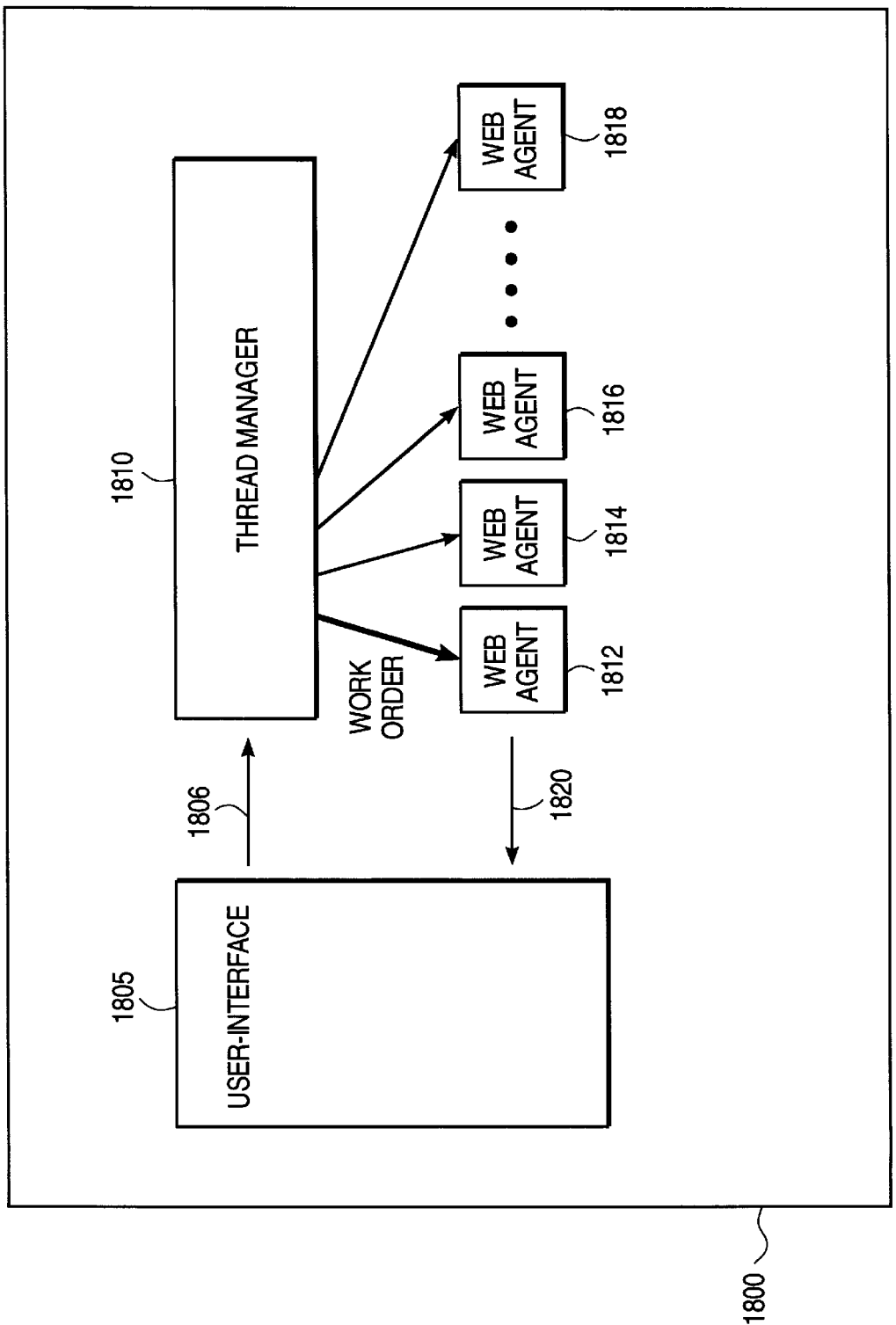
FIG. 18 is a block diagram of an application program according to one embodiment of the present invention.

FIG. 18 is a block diagram of an application program 1800 according to one embodiment of the present invention. Application program 1800 includes program code executable to provide user-interface 1805, thread manager 1810 and web agents (1812, 1814, 1816, 1818). As stated above, the exact number of web agents is determined by user settings. User interface 1805 receives search requests from an application user, and sends the search request to thread manager 1810, as indicated by arrow 1806. Thread manager 1810 communicates work orders corresponding to the search request to an idle one of web agents 1812, 1814, 1816, 1818. In one embodiment of the present invention, there are at least three types of work orders. The first type of work order is a request to resolve a search expression into a number of search engine expressions. For example, upon receiving the search expression "search:luggage", a web agent (or the thread manager itself, in an alternate embodiment) might generate the search engine expressions "query:AltaVista:luggage", "query:Yahoo:luggage", and others. As discussed above in reference to FIG. 17, the number and identity of the search engines for which search expressions are generated is determined according to user specification. After the search expression has been resolved into search engine expressions, the search engine expressions are communicated to the user-interface portion 1805 of the application program 1800 as indicated by arrow 1820. The user-interface 1805 displays the search engine expressions in the Links View window (element 1300 of FIG. 13) as discussed above, then passes the search engine expression to the thread manager 1810 for processing according to a second type of work order.

A second type of work order communicated to web agents 1812, 1814, 1816, 1818 by thread manager 1810 is a request to communicate a search engine request to a search engine. Since, in the preferred embodiment of the present invention, web agents 1812, 1814, 1816, 1818 are independent execution threads (separate executions of the same instance of program code), multiple web agents can concurrently communicate search engine requests to respective search engines. Since substantial time can be spent connecting and traveling to search engine web sites, parallel operation by web agents can substantially accelerate the web searching process.

Once the search engines have been prompted to identify web pages containing text consistent with the search expression, the web agents 1812, 1814, 1816, 1818 continue to communicate with respective search engines to receive identified URLs. The web agents 1812, 1814, 1816, 1818 communicate received URLs to the user-interface 1805 where they are displayed in various information windows as discussed above (e.g., FIG. 13 Links View, FIG. 10 Contents View). After the initial set of URLs have been displayed by the user-interface 1805, they are communicated to the thread manager 1810 for processing according to a third type of work order.

The third type of work order communicated to the web agents 1812, 1814, 1816, 1818 by thread manager 1810 is a request to retrieve and analyze web pages. At this point, the parallel execution of the web agents is particularly beneficial. In most cases search engines do not perform a web search in response to a query, and instead return URLs stored in previously recorded logs. Unfortunately search engine logs, at least in part, can become out of date by days or even weeks. Since content on the web is ever-changing, search engines often return URLs to non-existent or relocated web pages. When a web agent attempts to download such a non-existent or relocated web page, substantial time may pass before the web agent gives up. If only one web agent was operating at a time, web page analysis would come to a standstill, at least temporarily. However, since multiple web agents are concurrently executed to manage the web searching operation, web page analysis goes forward rapidly despite occasional inability to locate URL indicated web pages.

After web agents 1812, 1814, 1816, 1818 have linguistically analyzed downloaded web pages to extract keyword phrases, keywords and abstracts, the extracted information is provided to the user-interface 1805 for display in the appropriate view.

Figure 19:
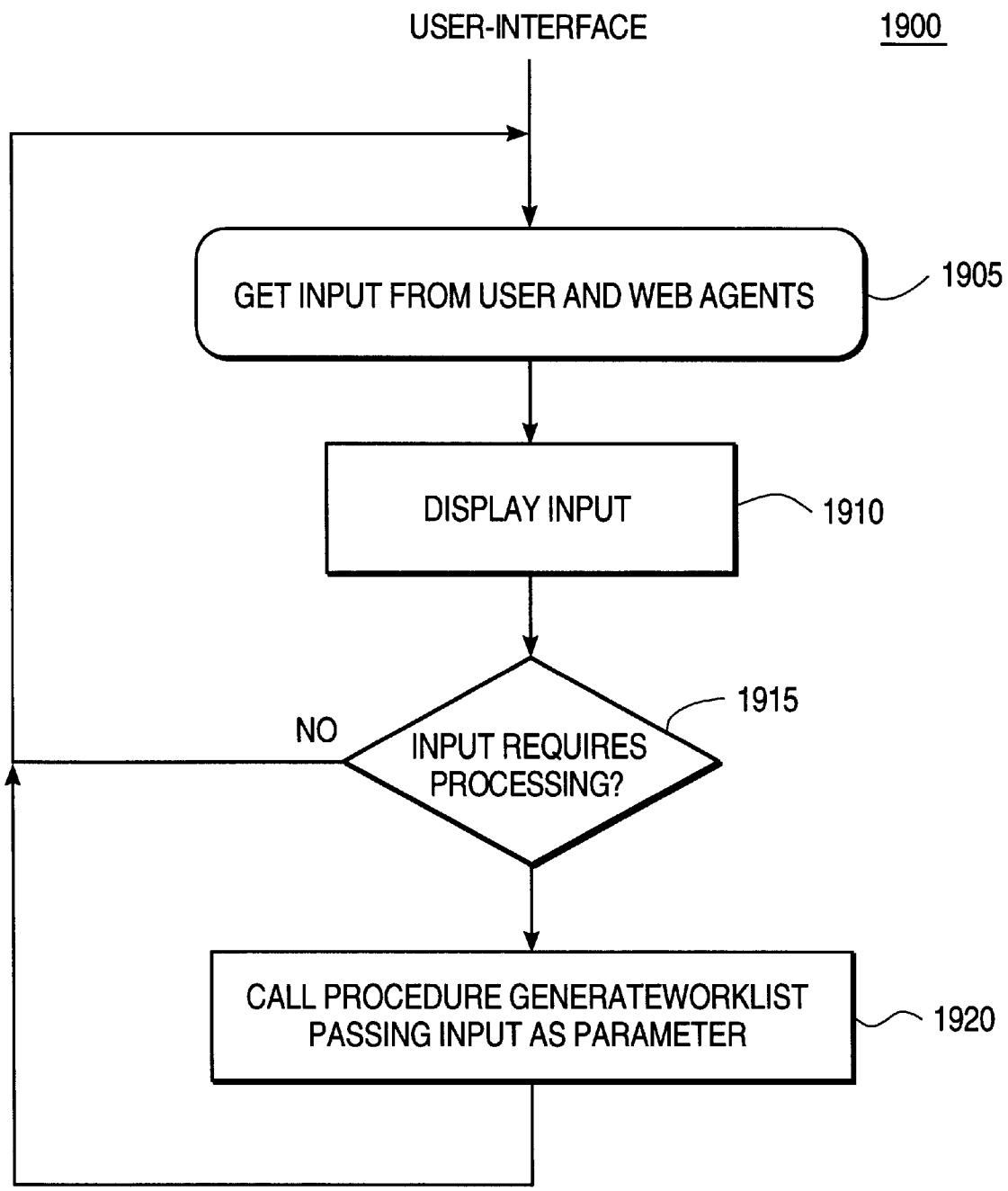
FIG. 19 is an execution diagram for a user-interface.

FIG. 19 illustrates an execution diagram of one embodiment of the user-interface 1805 of FIGS. 18. At step 1905 input data is received either from a computer-user, web agents or both. At step 1910 the input data is displayed in the appropriate window. At decision step 1915 the input data is examined to determine if it indicates that further processing is required. In the case of a search expression entered by the user, a query expression returned by a web agent (or thread manager, as the implementation may be), or a URL returned by a web agent, further processing will be required and execution proceeds to step 1920. At step 1920, a thread manager procedure referred to herein as "GenerateWorkList" is called, passing the input data as one or more parameters. After procedure GenerateWorkList has been completed, execution loops back to step 1905 to scan for more input data. Also, if at decision block 1915, it is determined that the input requires no further processing, execution of the user interface loops back to step 1905.

In the preferred embodiment of the present invention, user-interface code is executed in one thread of a multi-threaded application program. However, execution of user-interface code in a separate process of a multi-processed application program or execution of user-interface code as part of a single-process application program are considered to be within the spirit and scope of the present invention.

Figure 20:
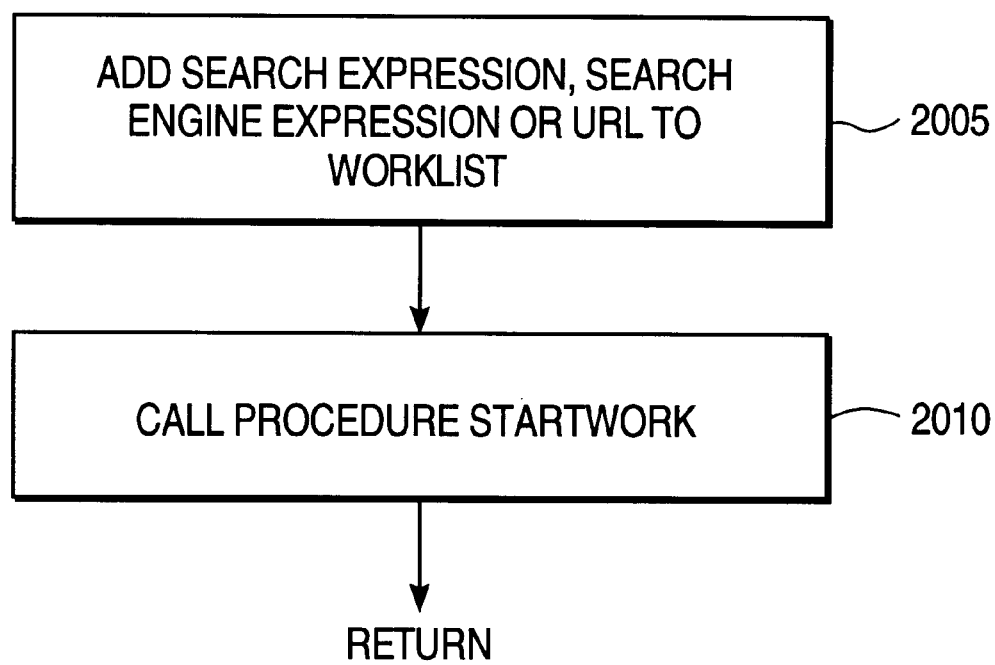
FIG. 20 is an execution diagram for procedure Generate-WorkList.

FIG. 20 is a execution diagram of thread manager procedure GenerateWorkList. Procedure GenerateWorkList receives one or more search expressions, search engine expressions or URLs as an input parameter or parameters and, at step 2005, adds the indicated work item to a work list. At step 2010, procedure StartWork is called to issue work orders to web agents according to the work list. After StartWork is completed, procedure GenerateWorkList returns to its caller.

Figure 21:
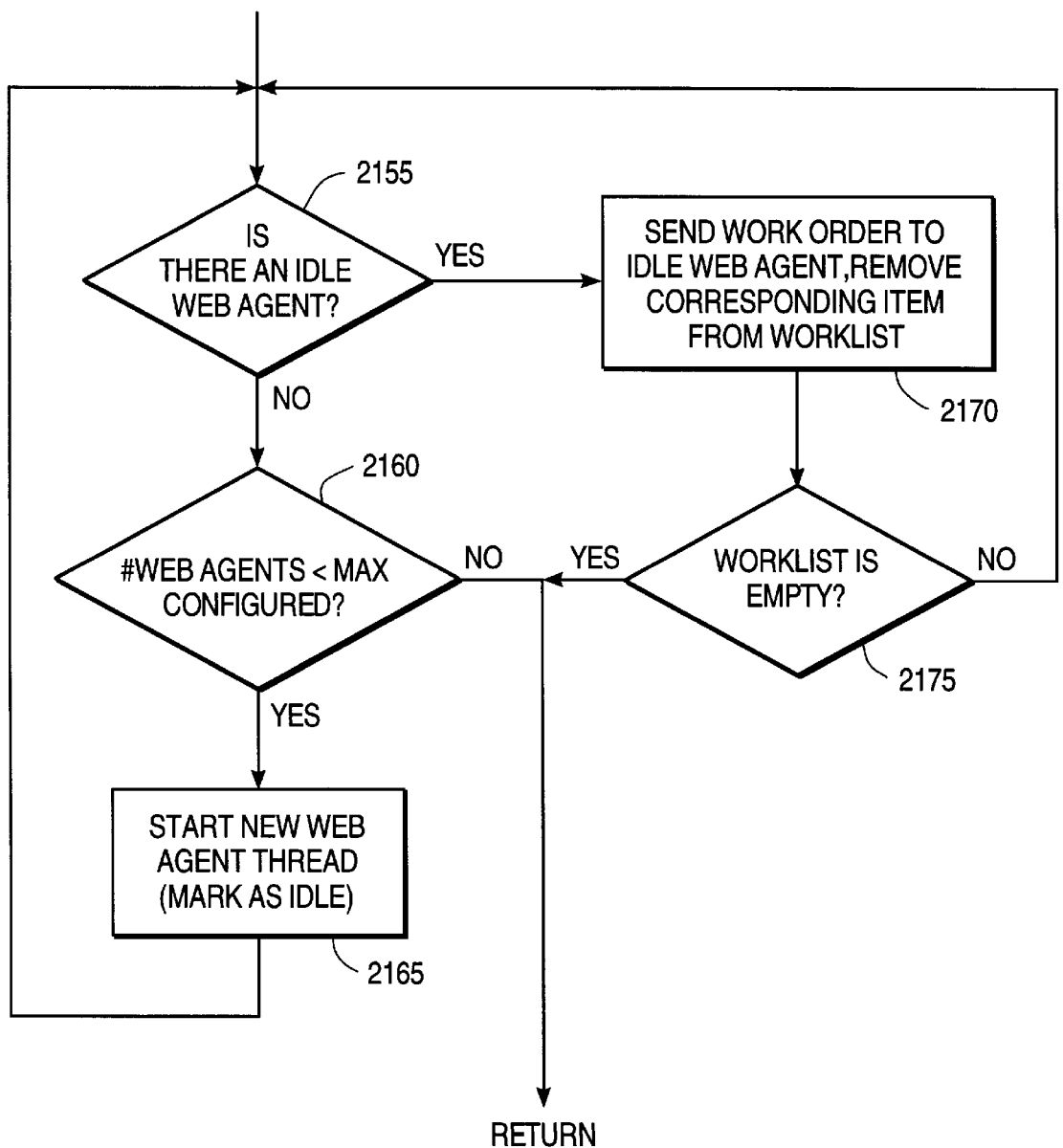
FIG. 21 is an execution diagram for procedure StartWork.

FIG. 21 is an execution diagram of thread manager procedure StartWork. At decision step 2155, a list of web agents is examined to determine if a web agent is idle. If no idle web agent is found, at step 2160, the number of existing web agents is compared against a user-defined maximum number of web agents. If less than the maximum allowed number of web agents exist, then a new web agent is started and marked as idle at step 2165. As stated above, in the preferred embodiment of the present invention, web agents are implemented as execution threads. However, web agents could also be separate processes.

After step 2165, execution of procedure StartWork loops back to decision step 2155 where the newly started idle web agent is detected.

After an idle web agent is detected at step 2155, step 2170 is executed to communicate a work order to the idle web agent. The work order corresponds to an item inserted in the work list by procedure GenerateWorkList so that, after a work order is issued to a web agent, the corresponding item is removed from the work list. As discussed above, in one embodiment of the present invention, the work order is a request either to generate one or more search engine expressions, initiate a search by a search engine or download and analyze a URL indicated web page. Other work orders such as sending one or more e-mail messages to aid in search engine evaluation or program debugging is within the spirit and scope of the present invention.

After a work order is sent to the idle web agent in step 2170, the work list is examined at decision step 2175. If the work list is empty, procedure StartWork is exited, returning to its caller. Procedure StartWork is also exited if it is determined at decision step 2160 that the maximum number of web agents have already been created.

Figure 22:
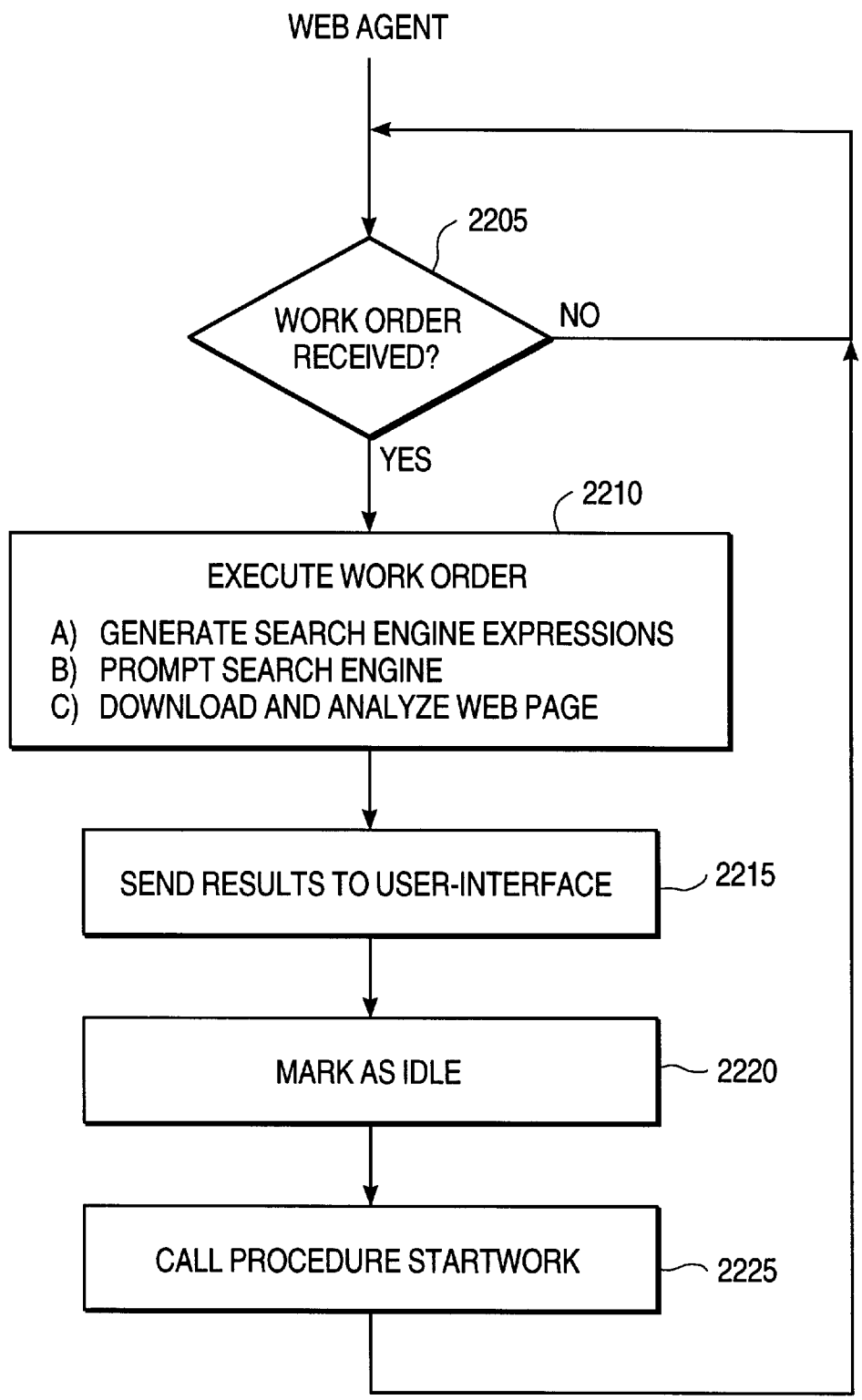
FIG. 22 is an execution diagram for a web agent.

FIG. 22 is an execution diagram of a web agent. At step 2205, an input queue is inspected to determine if a work order has been received. If so, at step 2210 the work order is executed by either generating one or more search engine expressions, prompting a search engine to perform a search, or downloading and analyzing a web page. As stated above, other types of work orders are possible. When the work order is completed, the results are sent to the user-interface in step 2215. Then, at step 2220, the web agent marks itself as idle and, at step 2225, calls thread manager procedure StartWork. Consequently, if there are additional work items to be processed, StartWork will communicate another work item to the web agent. After procedure StartWork is completed, execution loops back to decision step 2205 to begin polling for work orders. In one embodiment of the present invention a periodically executed procedure terminates web agents that have been idle for longer than a predetermined period of time. Other techniques may be used to terminate web agents, including self termination after executing step 2205 a threshold number of times in succession.

A method and apparatus for identifying a document based on keyword phrases automatically extracted from an initial set of documents is thus described.

What is claimed is:

1. A method for presenting to a computer-user information from web pages containing text consistent with a search expression, said method comprising the computer-implemented steps of:

prompting a computer-user to construct a search expression;

communicating the search expression to a plurality of web searching engines;

prompting each of the plurality of web searching engines to concurrently inspect a respective plurality of web pages and to identify web pages containing text consistent with the search expression;

linguistically analyzing the identified web pages to obtain keyword phrases therefrom; and displaying the keyword phrases obtained from the identified web pages in a navigable cross-index.

2. The method of claim 1 wherein said step of displaying the keyword phrases obtained from the identified web pages in a navigable cross-index comprises the step of indicating keyword phrases displayed in the navigable cross-index found in more than one of the identified web pages.

3. The method of claim 2 wherein said step of indicating keyword phrases displayed in the navigable cross-index that have been found in more than one of the identified web pages comprises the step of displaying keyword phrases that have been found in more than one of the identified web pages in a different color than keyword phrases that have been obtained from only one of the identified web pages.

4. The method of claim 1 further comprising the steps of:

detecting user selection of one of the keyword phrases displayed in the navigable cross-index;

determining one of the identified web pages from which the one of the keyword phrases was obtained; and displaying a web page abstract generated based on linguistic analysis of the one of the identified web pages.

5. The method of claim 1 wherein said step of communicating the search expression to a plurality of web searching engines comprises the step of communicating the search expression to a number of web searching engines, the number of web searching engines being determined based on characteristics of the computer implementing said step of communicating.

6. The method of claim 5 wherein the number of web searching engines is determined based on at least one of the processor speed, modem speed, and memory size characteristics of the computer implementing said step of communicating.

7. The method of claim 1 wherein said step of prompting each of the plurality of web engines to concurrently inspect a respective plurality of web pages comprises the step of prompting one of the plurality of web searching engines to inspect a number of web pages, the number of web pages being based on a parameter entered by the computer-user.

8. The method of claim 1 further comprising the steps of:

automatically identifying for the computer-user keyword phrases in an initial set of web pages, the initial set of web pages being defined by the web pages containing text consistent with the search expression;

prompting the computer-user to construct a query expression in which at least one of the keyword phrases is an operand; and identifying one of the initial set of web pages based on the query expression.

9. The method of claim 8 further comprising the step of displaying a tabbed index to the keyword phrases.

10. The method of claim 8 wherein said step of identifying keyword phrases in the initial set of web pages comprises the step of linguistically analyzing each web page of the initial set of web pages to identify the keyword phrases therein.

11. A computer-readable medium having stored thereon a plurality of sequences of instructions, said plurality of sequences of instructions including sequences of instructions which, when executed by a processor, cause said processor to:

prompt a computer-user to construct a search expression;

communicate the search expression to a plurality of web searching engines;

prompt each of the plurality of web searching engines to concurrently inspect a respective plurality of web pages and to identify web pages containing text consistent with the search expression;

linguistically analyze the identified web pages to obtain keyword phrases therefrom; and display the keyword phrases obtained from the identified web pages in a navigable cross-index.

12. The computer-readable medium of claim 11 wherein said step of communicating the search expression to a plurality of web searching engines, comprises the step of communicating the search expression to a plurality of web searching engines provided at respective sites on the World Wide Web.

13. A computer system comprising:

a bus;

a processor coupled to said bus;

a user input device coupled to said bus;

a display coupled to said bus;

a computer-network access device coupled to said bus; and a memory coupled to said bus, said memory being readable by said processor and having sequences of instructions stored therein which, when executed by said processor, cause said processor to:

prompt a computer-user to construct a search expression;

communicate the search expression to a plurality of web searching engines on the World Wide Web via said computer-network access device;

prompt each of the plurality of web searching engines to concurrently inspect a respective plurality of web pages and to identify web pages containing text consistent with the search expression;

linguistically analyze the identified web pages to obtain keyword phrases therefrom; and display the keyword phrases obtained from the identified web pages in a navigable cross-index.

14. A method for obtaining web pages containing text consistent with a search expression, said method comprising the computer-implemented steps of:

prompting a computer-user to construct a search expression;

starting a plurality of web agents to communicate the search expression to respective web searching engines;

concurrently receiving in each of the plurality of web agents universal resource locators (URLs) identifying respective web pages containing text consistent with the search expression;

linguistically analyzing the identified web pages to obtain keyword phrases therefrom; and displaying the keyword phrases obtained from the identified web pages in a navigable cross-index.

15. The method of claim 14 wherein said step of starting a plurality of web agents to communicate the search expression to respective web searching engines comprises the step of executing a plurality of execution threads in a multi-threaded application program.

16. A method for examining electronic mail, said method comprising the computer-implemented steps of:

reading a plurality of electronic mail messages from a mail server;

linguistically analyzing each of the plurality of electronic mail messages to identify for a user keyword phrases therein;

prompting the user to construct a query expression in which at least one of the keyword phrases is an operand; and sorting the plurality of electronic mail messages based on the query expression.

* * * * *